United States Patent
Liu et al.

(10) Patent No.: US 10,014,915 B2
(45) Date of Patent: Jul. 3, 2018

(54) ANTENNA PATTERN MATCHING AND MOUNTING

(71) Applicant: Aerohive Networks, Inc., Milpitas, CA (US)

(72) Inventors: Changming Liu, Cupertino, CA (US); George Gang Chen, Fremont, CA (US); Hai Lin, Zhejiang (CN); Liangfu Zhang, Zhejiang (CN)

(73) Assignee: Aerohive Networks, Inc., Milpitas, CA (US)

( * ) Notice: Subject to any disclaimer, the term of this patent is extended or adjusted under 35 U.S.C. 154(b) by 610 days.

(21) Appl. No.: 14/078,434

(22) Filed: Nov. 12, 2013

(65) Prior Publication Data

US 2014/0146902 A1    May 29, 2014

Related U.S. Application Data

(60) Provisional application No. 61/762,238, filed on Feb. 7, 2013, provisional application No. 61/725,435, filed on Nov. 12, 2012.

(51) Int. Cl.
| | | |
|---|---|---|
| *H04B 7/0413* | (2017.01) |
| *H04B 7/06* | (2006.01) |
| *H04B 7/08* | (2006.01) |
| *H04B 7/10* | (2017.01) |
| *H01Q 1/38* | (2006.01) |

(Continued)

(52) U.S. Cl.
CPC ............ *H04B 7/0413* (2013.01); *H01Q 1/38* (2013.01); *H01Q 3/24* (2013.01); *H01Q 5/40* (2015.01); *H01Q 21/28* (2013.01); *H01Q 25/00* (2013.01); *H01Q 25/001* (2013.01);

(Continued)

(58) Field of Classification Search
CPC ...... H04B 7/0413; H04B 7/10; H04B 7/0617; H04B 7/0689; H04B 7/0871; H01Q 21/205; H01Q 21/24; H01Q 25/04
See application file for complete search history.

(56) References Cited

U.S. PATENT DOCUMENTS 9,014,066 B1 *  4/2015  Wang .................... H04B 17/12
                                              370/280
9,713,019 B2 *  7/2017  Negus ................... H04W 24/02
(Continued)

FOREIGN PATENT DOCUMENTS

WO    2009004361    1/2009

OTHER PUBLICATIONS

International Application No. PCT/US2014/015423, International Search Report and Written Opinion dated May 30, 2014.

*Primary Examiner* — Hirdepal Singh
(74) *Attorney, Agent, or Firm* — Sheppard, Mullin, Richter & Hampton LLP

(57) ABSTRACT

A technique for improving wireless communication characteristics involving matching transmitter antenna patterns to receiver antenna patterns. In a specific implementation, the transmitter antenna pattern adapts to changing parameters, such as when a smartphone is initially held in a first orientation and is later held in a second orientation. Because the transmitter antenna pattern matches receiver antenna patterns, signal quality between stations improves. In some implementations, antennas are organized and mounted to maximize spatial diversity to cause peak gains in different directions.

23 Claims, 11 Drawing Sheets

(51) Int. Cl.
*H01Q 21/28* (2006.01)
*H01Q 25/00* (2006.01)
*H01Q 5/40* (2015.01)
*H01Q 3/24* (2006.01)

(52) U.S. Cl.
CPC ......... *H04B 7/0689* (2013.01); *H04B 7/0871* (2013.01); *H04B 7/10* (2013.01); *H04B 7/0617* (2013.01)

(56) References Cited

U.S. PATENT DOCUMENTS

| | | | |
|---|---|---|---|
| 9,871,284 B2* | 1/2018 | Piazza | H01Q 1/1257 |
| 2003/0092402 A1* | 5/2003 | Shapira et al. | 455/101 |
| 2009/0005121 A1* | 1/2009 | Wong et al. | 455/562.1 |
| 2010/0119002 A1* | 5/2010 | Hartenstein | 375/267 |
| 2010/0259346 A1 | 10/2010 | Runyon | |
| 2011/0085459 A1* | 4/2011 | Kuriki | 370/252 |
| 2011/0151810 A1 | 6/2011 | Su et al. | |
| 2013/0069813 A1* | 3/2013 | Vangen | H01Q 17/00 342/1 |
| 2013/0328723 A1* | 12/2013 | Rappaport | H04B 1/3838 342/372 |
| 2014/0029450 A1* | 1/2014 | Vitek | H04W 16/28 370/252 |
| 2014/0074440 A1* | 3/2014 | Yamagajo | G06F 17/50 703/1 |
| 2014/0327587 A1* | 11/2014 | Won | H01Q 5/335 343/720 |
| 2015/0022411 A1* | 1/2015 | Ali | H01Q 1/50 343/793 |
| 2017/0317725 A1* | 11/2017 | Lea | H04B 7/0408 |

* cited by examiner

ANTENNA PATTERN MATCHING AND MOUNTING

CROSS-REFERENCE TO RELATED APPLICATIONS

The present application claims priority from and the benefit of U.S. Provisional Patent Application No. 61/762,238 filed Feb. 7, 2013, entitled "Antenna Pattern Matching," and U.S. Provisional Patent Application No. 61/725,435 filed Nov. 12, 2012, entitled "Smart Antenna Wireless Network Device," each of which is incorporated by reference herein.

BACKGROUND

An area of ongoing research and development is in improving wireless communication signal quality, speed, efficiency, or other characteristics. Wireless networks are frequently governed by 802.11 standards. While not all networks need to use all of the standards associated with 802.11, a discussion of the standards by name, such as 802.11n provides, at least partly because the standards are well-known and documented, a useful context in which to describe issues as they relate to wireless systems.

A specific area of wireless communication research and development is multiple-input multiple-output (MIMO). With MIMO, a transmitter may have multiple antennas for transmitting signals and a receiver may have multiple antennas for receiving the signals. For example, in a 3×3 (three transmitters and three receivers) MIMO system, stations can use three antennas to transmit and three antennas to receive. Most wireless local area network (WLAN) wireless access points (WAP) are capable of 2×2 or 3×3, though there is a small percentage of low-cost WAP that only support 1×1, 4×4 WLAN WAP are expected to hit the market soon, and higher-value MIMO is possible. For example, laptops often have 2×2 or 3×3 MIMO WLAN stations and smart phones often have 1×1 MIMO WLAN stations, with the lower values used primarily to conserve battery power. (Wireless data transmission is one of the biggest power drains on smart phone batteries.)

The foregoing examples of the related art are intended to be illustrative and not exclusive. For example, wireless stations may use different protocols other than 802.11, potentially including protocols that have not yet been developed. However, problems associated with improving wireless communication characteristics. Other limitations of the relevant art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not necessarily limiting in scope. In various embodiments, one or more of the above-described problems have been addressed, while other embodiments are directed to other improvements.

A technique for effective antenna pattern searching involves matching transmitter antenna patterns to receiver antenna patterns. There could be numerous antenna patterns within a multiple-input multiple-output (MIMO) antenna system in a wireless access points (WAP) when a transmit antenna has many different patterns to choose from. In a specific implementation, antenna patterns are grouped and categorized by station types in order to reduce the number of patterns to search for each station type. When a station associates with a WAP, the WAP can profile the station in a first of multiple categories, such as 1×1, 2×2, 3×3, or 4×4; or in accordance with some other antenna or spatial stream configuration, characteristic, or parameter. The WAP can group discrete antenna patterns into station antenna pattern profiles that are each associated with a station type. The WAP can then determine that a station is of a specific station type having an associated station antenna pattern profile. The WAP can select an antenna pattern group corresponding to the station type. The WAP can select the antenna pattern group by using the station antenna pattern profile that is associated with the station type. The WAP can then search the antenna pattern group to determine an optimal antenna pattern. The WAP can search a subplurality of the antenna patterns in the antenna pattern group to determine an optimal antenna pattern. In this way, the number of patterns searched before reaching an apparently optimal antenna pattern is reduced and/or the efficiency of a search algorithm can be improved. Because a transmitter antenna pattern matches a receiver antenna pattern, signal quality between stations improves.

In a specific implementation, the transmitter antenna pattern adapts to changing parameters, such as when a smartphone is initially held in a first orientation and is later held in a second orientation.

Techniques described herein also include techniques for mounting antennas along a circle or a projection of a circle and according to their polarization.

These and other advantages will become apparent to those skilled in the relevant art upon a reading of the following descriptions and a study of the several examples of the drawings.

DETAILED DESCRIPTION

Figure 1:
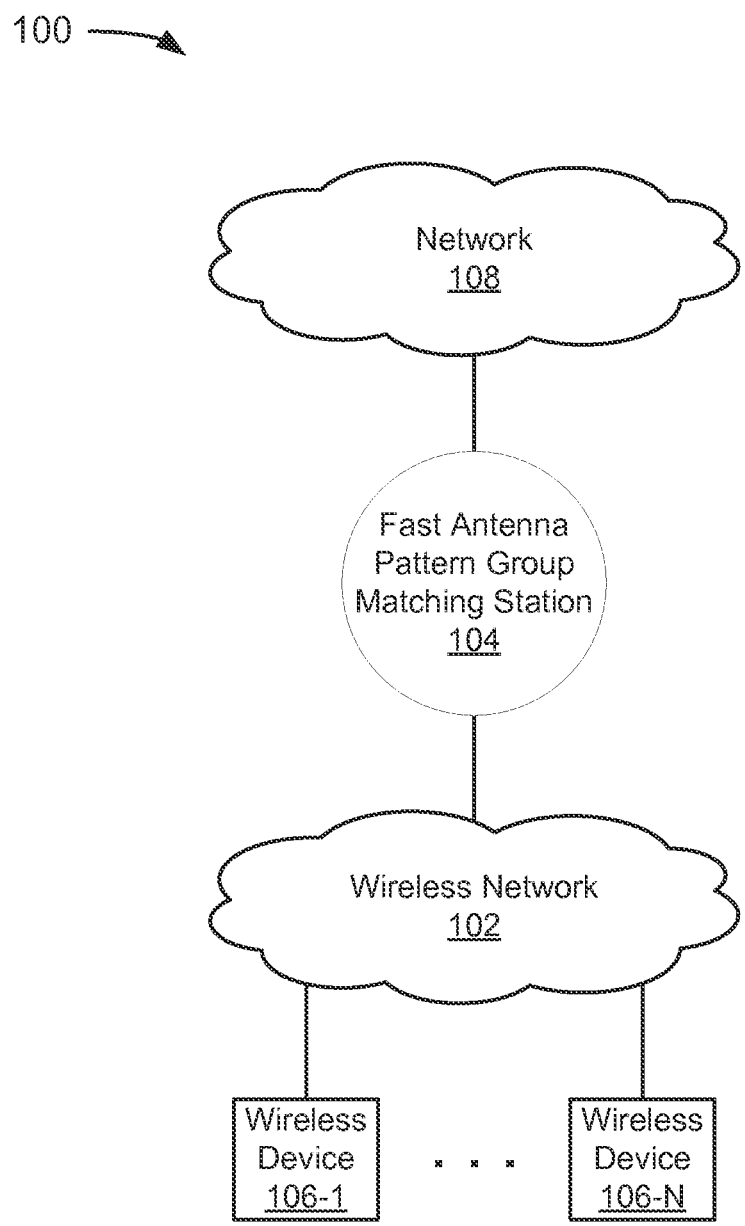
FIG. 1 depicts a diagram of an example of system in which a fast antenna pattern group matching station efficiently matches an antenna configuration to an antenna pattern associated with another station.

FIG. 1 depicts a diagram 100 of an example of system in which an antenna pattern group matching station efficiently matches an antenna configuration to an antenna pattern associated with another station. In the example of FIG. 1, the diagram 100 includes a wireless network 102, a fast antenna pattern group matching station 104, stations 106-1 to 106-N (collectively, stations 106), and a network 108.

In the example of FIG. 1, the wireless network 102 is intended to represent a wide variety of applicable wireless network technologies. As used herein, a wireless network refers to any type of wireless network, including but not limited to a structured network or an ad hoc network. Data on a wireless network is often encrypted. However, data may also be sent in the clear, if desired. With encrypted data, a rogue device will have a difficult time learning any information (such as passwords, etc.) from stations before countermeasures are taken to deal with the rogue, assuming countermeasures are necessary.

The wireless network 102 may or may not be IEEE 802.11-compatible. In this paper, 802.11 standards terminology is used by way of relatively well-understood example to discuss implementations that include wireless techniques. For example, a station, as used in this paper, may be referred to as a device with a media access control (MAC) address and a physical layer (PHY) interface to a wireless medium that complies with the IEEE 802.11 standard. Thus, for example, stations and a wireless access point (WAP) with which the stations associate can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the wireless network 102 includes a WLAN. Administrative control of a WLAN may or may not include ownership of hardware for an implementation that includes offering computing resources as a service. In a specific implementation, the wireless network 102 includes a cloud network.

In the example of FIG. 1, the fast antenna pattern group matching station 104 is coupled to the wireless network 102.

In a specific implementation, the fast antenna pattern group matching station 104 is implemented as a WAP of an infrastructure network. In another specific implementation, the fast antenna pattern group matching station 104 is implemented as a node of an ad-hoc network. Some functionality, described later, attributable to the fast antenna pattern group matching station 104 can be carried out at an upstream computer system, distributed to other stations, or carried out by an on-device computer system.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

In the example of FIG. 1, the stations 106 are coupled to the wireless network 102. In a specific implementation, the stations 106 include wireless devices or clients that are coupled to the wireless network 102. The stations 106 can be referred to as being "on" or "in" the wireless network 102. Depending upon the context, it may be useful to distinguish between the stations 106, such as by dividing the stations 106 into those that are attempting to establish a link with the fast antenna pattern group matching station 104, those that have already established a link through the fast antenna pattern group matching station 104, those that have already established a link through some other station (not shown), or in some other applicable manner.

In the example of FIG. 1, the network 108 is coupled to the fast antenna pattern group matching station 104. In various implementations, the network 108 can include practically any applicable type of communications network, such as the Internet or infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, the network 108 can include, for example, a wide area network (WAN), metropolitan area network (MAN), campus area network (CAN), or local area network (LAN), but the network 108 could at least theoretically be of any size or characterized in some other fashion (e.g., personal area network (PAN) or home area network (HAN), to name a couple of alternatives). In a specific implementation in which the fast antenna pattern group matching station 104 is implemented as a WAP, the network 108 includes an infrastructure network. In a specific implementation in which the fast antenna pattern group matching station 104 is part of an ad hoc network, the network 108 is less likely to include an infrastructure network.

Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet. The example of FIG. 1 is intended to illustrate a network 108 that may or may not include more than one private network. In specific implementations, the network 108 can be implemented as a WAN, public switched telephone network (PSTN), cellular network, or some other network or combination of similar or different networks capable of coupling two private networks.

Figure 2:
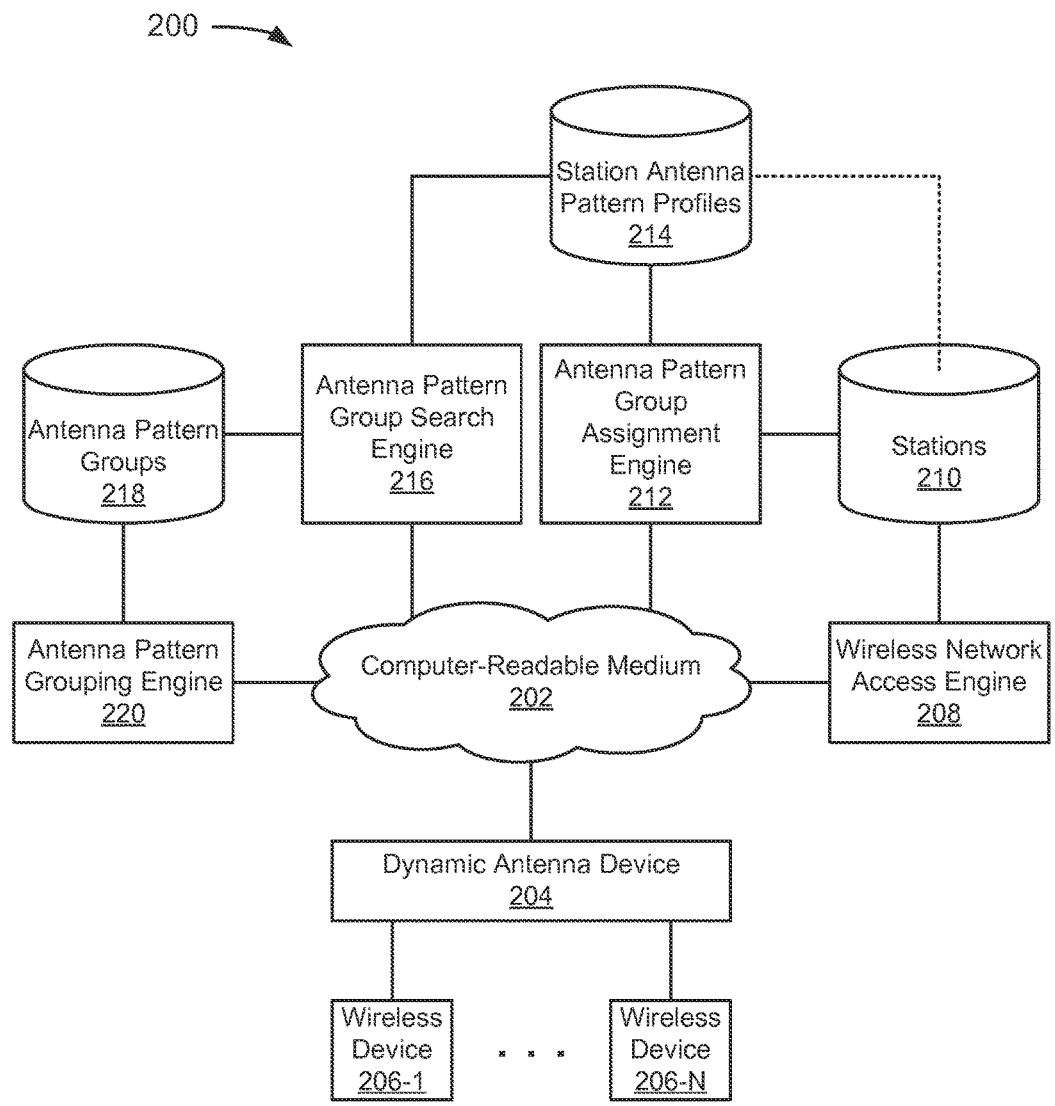
FIG. 2 depicts a diagram of an example of a system for antenna pattern group matching.

FIG. 2 depicts a diagram 200 of an example of a system for antenna pattern group matching. In the example of FIG. 2, the diagram 200 includes a computer-readable medium 202, a dynamic antenna device 204, stations 206-1 to 206-N (stations 206), a wireless network access engine 208, a stations datastore 210, an antenna pattern group assignment engine 212, a station antenna pattern profiles datastore 214, an antenna pattern group search engine 216, an antenna pattern groups datastore 218, and an antenna pattern grouping engine 220.

In the example of FIG. 2, the computer-readable medium 202 is intended to represent a variety of potentially applicable technologies. Where two components are co-located on a device, the computer-readable medium 202 can include a bus or other data conduit or plane. Where a first component is co-located with the dynamic antenna device 204 and a second component is located on a different device, the computer-readable medium 202 can include a wireless or wired back-end network or LAN. The computer-readable medium 202 can also encompass a relevant portion of a WAN or other network, if applicable.

In the example of FIG. 2, the dynamic antenna device 204 is coupled to the computer-readable medium 202. In a specific implementation, the dynamic antenna device 204 is configured to turn electrical signals into electromagnetic (e.g., radio) waves, and vice versa. In specific implementations, the dynamic antenna device 204 includes a rigid metallic structure that is sometimes referred to as an "antenna," a wire form structure that is sometimes referred to as an "aerial," or some other applicable structure. In this paper, "aerials," "antennas," and other structures with applicable functionality are referred to as antennas. The dynamic antenna device 204 may or may not include (or could be characterized as including) a support structure, enclosure, or the like. The dynamic antenna device 204 may or may not include additional components such as, for example, an integrated preamplifier or mixer, reflective or directive elements or surfaces (e.g., parasitic elements, parabolic reflectors or horns that serve to direct electromagnetic beams or other desired radiation pattern, etc.), or the like.

In a specific implementation, the dynamic antenna device 204 includes an arrangement of metallic conductors ("elements"), electrically connected to a receiver or transmitter. An oscillating current of electrons forced through the dynamic antenna device 204 by a transmitter will create an oscillating magnetic field around the elements, while the charge of the electrons also creates an oscillating electric field along the elements. These time-varying fields, when created in the proper proportions, radiate away from the antenna into space as a moving transverse electromagnetic field wave. Conversely, during reception, the oscillating electric and magnetic fields of an incoming radio wave exert force on the electrons in the elements, causing them to move back and forth, creating oscillating currents in the dynamic antenna device 204. In a specific implementation, the dynamic antenna device 204 includes a directional or high gain antenna. In another specific implementation, the dynamic antenna device 204 includes an omnidirectional antenna.

The dynamic antenna device 204 can include separate antenna arrays for transmission and reception of radio signals, or can include an antenna array that is used for both transmission and reception of radio signals. As used in this paper, an antenna array is intended to include one or more antennas. (An antenna array with one and only one antenna can alternatively be referred to as "an antenna array," "an antenna," or "an antenna array with one antenna.") In transmission, a radio transmitter supplies an oscillating radio frequency electric current to terminals of the dynamic antenna device 204, and the dynamic antenna device 204 radiates the energy from the current as electromagnetic waves. In reception, the dynamic antenna device 204 intercepts power of an electromagnetic wave and produces a voltage at its terminals, which is applied to a receiver to be amplified.

In a specific implementation, the dynamic antenna device 204 includes an antenna array on radio frequency (RF) chains having associated polarizations. The mounting locations of antennas of the antenna array can be separated to add spatial diversity and directed to cause peak gains in different directions from one another. By selecting different combinations of diversities in polarization, space, and gain, MIMO stream de-correlation can be improved and a received signal strength indicator (RSSI) can be increased in a downlink direction.

In a specific implementation, a first polarization of an antenna array of the dynamic antenna device 204 defines an orientation of an electric field (E-plane) of a radio wave with respect to the Earth's surface and is determined by the physical structure of the antenna(s) of the antenna array and by an orientation of the antenna(s). It has not related to antenna directionality terms (e.g., "horizontal", "vertical", and "circular" in an antenna directionality context). Thus, a simple straight wire antenna will have one polarization when mounted vertically, and a different polarization when mounted horizontally.

Polarization is the sum of the E-plane orientations over time projected onto an imaginary plane perpendicular to the direction of motion of the radio wave. In the most general case, polarization is elliptical, meaning that the polarization of the radio waves varies over time. Two special cases are linear polarization (the ellipse collapses into a line) and circular polarization (in which the two axes of the ellipse are equal). In linear polarization the antenna compels the electric field of the emitted radio wave to a particular orientation. Depending on the orientation of the antenna mounting, the usual linear cases are horizontal and vertical polarization. In circular polarization, the antenna continuously varies the electric field of the radio wave through all possible values of its orientation with regard to the Earth's surface. Circular polarizations, like elliptical ones, are classified as right-hand polarized or left-hand polarized using a "thumb in the direction of the propagation" rule. Optical researchers use the same rule of thumb, but pointing it in the direction of the emitter, not in the direction of propagation, and so are opposite to radio engineers' use.

The dynamic antenna device 204 can be matched with a similarly polarized station. The dynamic antenna device 204 can have a default, preset, sticky (e.g., only changing when explicitly changed), or other polarization for an initial wireless coupling. After the initial coupling, the polarization can be changed by selecting an appropriate antenna array, element, or the like. As used in this paper, the dynamic antenna device 204 is "dynamic" at least in the sense that a first active antenna array with a first polarization can be electronically switched to a second active antenna array with a second polarization. The first active antenna array can include an applicable one or more different components or an applicable one or more same components with a different configuration as the second active antenna array, depending upon implementation- and/or configuration-specific factors.

Knowledge of the antenna construction can speed matching an antenna pattern of the dynamic antenna device 204 with a station. Polarization is largely predictable from antenna construction but, especially in directional antennas, the polarization of side lobes can be quite different from that of the main propagation lobe. For radio antennas, polarization corresponds to the orientation of the radiating element in an antenna. A vertical omnidirectional Wi-Fi antenna will have vertical polarization. An exception is a class of elongated waveguide antennas in which vertically placed antennas are horizontally polarized. Many commercial antennas are marked as to the polarization of their emitted signals.

Figure 3:
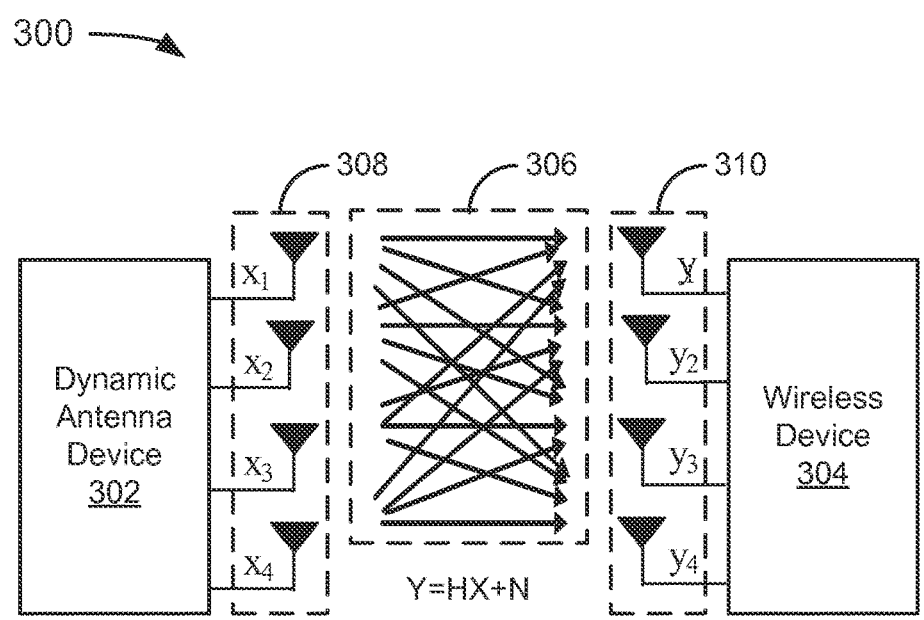
FIG. 3 depicts a diagram an example of a MIMO channel between a dynamic antenna device and a station.

In a specific implementation, the dynamic antenna device 204 is capable of MIMO. FIG. 3 depicts a diagram 300 of an example of a MIMO channel between a dynamic antenna device 302 and a station 304. The station can be a wireless device. In the example of FIG. 3, the dynamic antenna device 302 has, for illustrative purposes only, four transmit antennas $x_1$, $x_2$, $x_3$, and $x_4$; and the station 304 has, for illustrative purposes only, four receive antennas $y_1$, $y_2$, $y_3$, and $y_4$. The path from the antennas $x_N$ to the antennas $y_M$ may be referred to collectively as a MIMO channel 306.

The MIMO channel 306 is characterized by a matrix H with M rows and N columns, where N is the number of antennas at the dynamic antenna device 302, and M is the number of antennas at the station 304. The matrix H describes the channel gains between all transmit-receive antenna pairs of the two matrix mesh elements, i.e. the matrix element $h_{ij}$ in the $i^{th}$ row and $j^{th}$ column of H is the channel gain between the $j^{th}$ transmit antenna and the $i^{th}$ receive antenna. The transmitted signal is a vector $X=[x_1, \ldots x_N]$, where $x_j$ is the signal transmitted from the $j^{th}$ antenna of the dynamic antenna device 302. The received signal is a vector $Y=[y_1, \ldots y_M]$, where $y_i$ is the received signal at the $i^{th}$ antenna of the station 304. The received signal at the $i^{th}$ receive antenna is corrupted by noise and possibly interference and the vector $N=[n_1, \ldots, n_M]$ describes the noise and interference associated with all receive antennas. The received signal vector Y is characterized by the matrix multiplication Y=HX+N, i.e.

$$y_i = \sum_{j=1}^{N} h_{ij} x_j + n_i,$$

so that $y_i$ is the sum of signals associated with all transmit signals $x_j$, i=1, ..., N multiplied by the channel gain $h_{ij}$ from the $j^{th}$ transmit antenna to the $i^{th}$ receiver antenna, plus the additive noise $n_i$ associated with the $i^{th}$ receiver antenna.

Multiple-input and single-output (MISO), single-input and multiple-output (SIMO), and single-input single-output (SISO) are degenerate cases of MIMO. MISO is when the receiver has a single antenna. SIMO is when the transmitter has a single antenna. SISO is when neither the transmitter nor the receiver have multiple antennas. The acronym MIMO could be considered to include the degenerate cases, if applicable. The techniques may also be applicable to multi-user MIMO (MU-MIMO), cooperative MIMO (CO-MIMO), MIMO routing, OFDM-MIMO, or other MIMO technologies.

The multiple antennas between the dynamic antenna device 302 and the station 304 can be used to increase data rates by creating multiple independent channels between the devices (e.g., via spatial multiplexing): the maximum number of such data paths that can be created is the minimum of N and M. Alternatively, transmitted signals can be combined via transmit diversity or beamforming, and/or the received signals can be combined via receive diversity, which increases link robustness. Also, beamsteering can be done to steer an antenna beam in a given direction, which increases range and/or reduces interference. These techniques are not mutually exclusive, and some antennas can be used for spatial multiplexing, others for diversity, and still others for beamsteering or beamforming.

Referring once again to the example of FIG. 2, the stations 206 are coupled to the dynamic antenna device 204. In a specific implementation, the stations 206 can have variable antenna profiles, such as one antenna, two antennas, three antennas, . . . . The antenna profiles can also include polarization knowledge derived from device characteristics, such as type of device (e.g., laptop), model, or the like. The greater the ability to distinguish between antenna parameters, the greater the number of antenna profiles that can be meaningfully distinguished using techniques described later. For example, a laptop might have two antenna arrays with preset polarizations; this knowledge can improve the speed with which an optimal antenna pattern can be found from a finite number of antenna patterns. As is used in this paper, an optimal antenna pattern can be defined as having an estimated highest gain of any of the other discrete antenna patterns from either or both polarization matches and summation of signals.

In the example of FIG. 2, the wireless network access engine 208 is coupled to the computer-readable medium 202. In a specific implementation, the wireless network access engine 208 is responsible for helping to establish a link between the wireless network and the station 206. Relevant functionality can be distributed (e.g., across multiple WAPs), pushed upstream (e.g., to an authentication server), or handled in some other applicable manner. In a specific implementation, the wireless network access engine 208 also obtains information useful for determining appropriate antenna pattern group assignments for the discrete antenna patterns of the station 206. Such information can include polarization values or spatial stream characteristics for the antenna patterns. The polarization values can include one or more discrete polarization values that can include a non-null, non-redundant combination of discrete polarization values.

An engine, as used in this paper, includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. Herein, changes from one operational mode to another, transformation of data, and other activities may or may not be accomplished using engines.

In the example of FIG. 2, the stations datastore 210 is coupled to the wireless network access engine 208. In a specific implementation, the stations datastore 210 includes data about the stations 206. Other data, such as account data, routing tables, etc. are likely to be maintained either locally at a WAP or upstream, but are not depicted in the example of FIG. 2 to better illustrate the components discussed with reference to FIG. 2.

A datastore, as used in this paper, can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper. Herein, state and other data can be saved in a datastore.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself Many data structures use both principles, sometimes combined in non-trivial ways. The implementation of a data structure usually entails writing a set of procedures that create and manipulate instances of that structure.

In the example of FIG. 2, the antenna pattern group assignment engine 212 is coupled to the computer-readable medium 202, the stations datastore 210, and the station antenna pattern profiles datastore 214. In a specific implementation, the antenna pattern group assignment engine 212 uses data in the stations datastore 210 about the stations 206 to categorize the stations 206 into antenna pattern groups. The assigned antenna pattern groups can be stored in the stations datastore 210 in association with relevant data structures of the stations 206. The station antenna pattern profiles datastore 214 can be considered part of the stations datastore 210, a characteristic which a dotted line coupling the stations datastore 210 and the station antenna pattern profiles datastore 214 is intended to represent. As such, in a specific implementation, the antenna pattern group assignment engine 212 stores assigned antenna pattern groups in the station antenna pattern profiles datastore 214 in association with relevant data structures of the stations 206.

In the example of FIG. 2, the antenna pattern group search engine 216 is coupled to the computer readable medium 202, the station antenna pattern profiles datastore 214, and the antenna pattern groups datastore 218. As was just discussed, the station antenna pattern profiles datastore 214 includes data structures of the stations 206 that include station antenna pattern profiles. The antenna pattern groups datastore 218 includes data structures of antenna pattern groups. The antenna pattern group search engine 216 matches the station antenna pattern profile of a station 206 to an antenna pattern group for that profile. For any given profile, the antenna pattern group search engine 216 will match a relevant to one and only one antenna pattern group. Depending upon the implementation, it may or may not be possible to match a profile that lacks certain information to a first antenna pattern group and the same profile but without the lacking information to a second antenna pattern group, but the mapping of a given profile to an antenna pattern group is one-to-one or many-to-one. Depending upon the implementation, it may or may not be possible to change an antenna pattern group so that mapping a first profile at one time gives a different result than mapping the first profile at another time.

In the example of FIG. 2, the antenna pattern grouping engine 220 is coupled to the computer-readable medium 202 and the antenna pattern groups datastore 218. The antenna pattern grouping engine 220 can include an interface to enable a person or artificial agent to create, edit, or delete antenna pattern groups.

In the example of FIG. 2, in operation, the antenna pattern grouping engine 220 receives antenna pattern group data from a person or artificial agent. The antenna pattern grouping engine 220 saves a data structure in the antenna pattern groups datastore 218 that includes parameters of antenna pattern groups.

In the example of FIG. 2, in operation, the dynamic antenna device 204 receives a wireless message from a station 206-1. The wireless message may or may not be in response to a wireless message (e.g., a beacon) previously sent from the dynamic antenna device 204. The wireless network access engine 208 facilitates establishing a link between the 206-1 and a service of the wireless network, which typically but not necessarily includes at least authenticating the station 206-1. The wireless network access engine 208 stores a data structure in the stations datastore 210 that includes parameters of the station 206-1, such as, e.g., a MAC address.

In the example of FIG. 2, in operation, the antenna pattern group assignment engine 212 determines from the relevant data structure in the stations datastore 210 a station antenna pattern profile that is appropriate for the station 206-1, given the known parameters of the station 206-1. The antenna pattern group assignment engine 212 stores the station antenna pattern profile in the station antenna pattern profiles datastore 214.

In the example of FIG. 2, in operation, the antenna pattern group search engine 216 matches a data record in the station antenna pattern profiles datastore 214 of the station antenna pattern profile of the station 206-1 to a data record in the antenna pattern groups datastore 218 of an applicable antenna pattern group of the plurality of antenna pattern groups represented in the antenna pattern groups datastore 218. The antenna pattern group search engine 216 then searches through antenna patterns of the applicable antenna pattern group in accordance with a search algorithm. The search algorithm can include, for example, in-order searching of a specific subplurality of the antenna patterns of the applicable one of the antenna pattern groups, selecting a special sequence of antenna patterns, following some other algorithm that results in searching a proper antenna pattern group or subplurality of the antenna pattern group.

In the example of FIG. 2, in operation, the wireless network access engine 208 controls the dynamic antenna device 204 to utilize the antenna pattern matching the antenna pattern profile of a station. Advantageously, the system facilitates rapid searching of antenna pattern groups to match individual ones of the station 206, then configures the dynamic antenna device 204 appropriately for each of the station 206. The increased search speed enables the system to utilize resources on activities other than search, the alternative being matching an antenna pattern in a non-optimal manner. Due to the (at least) dual advantages of the system, the system can be characterized as having "fast antenna pattern group searching" or "optimal efficient antenna pattern group searching."

Figure 4:
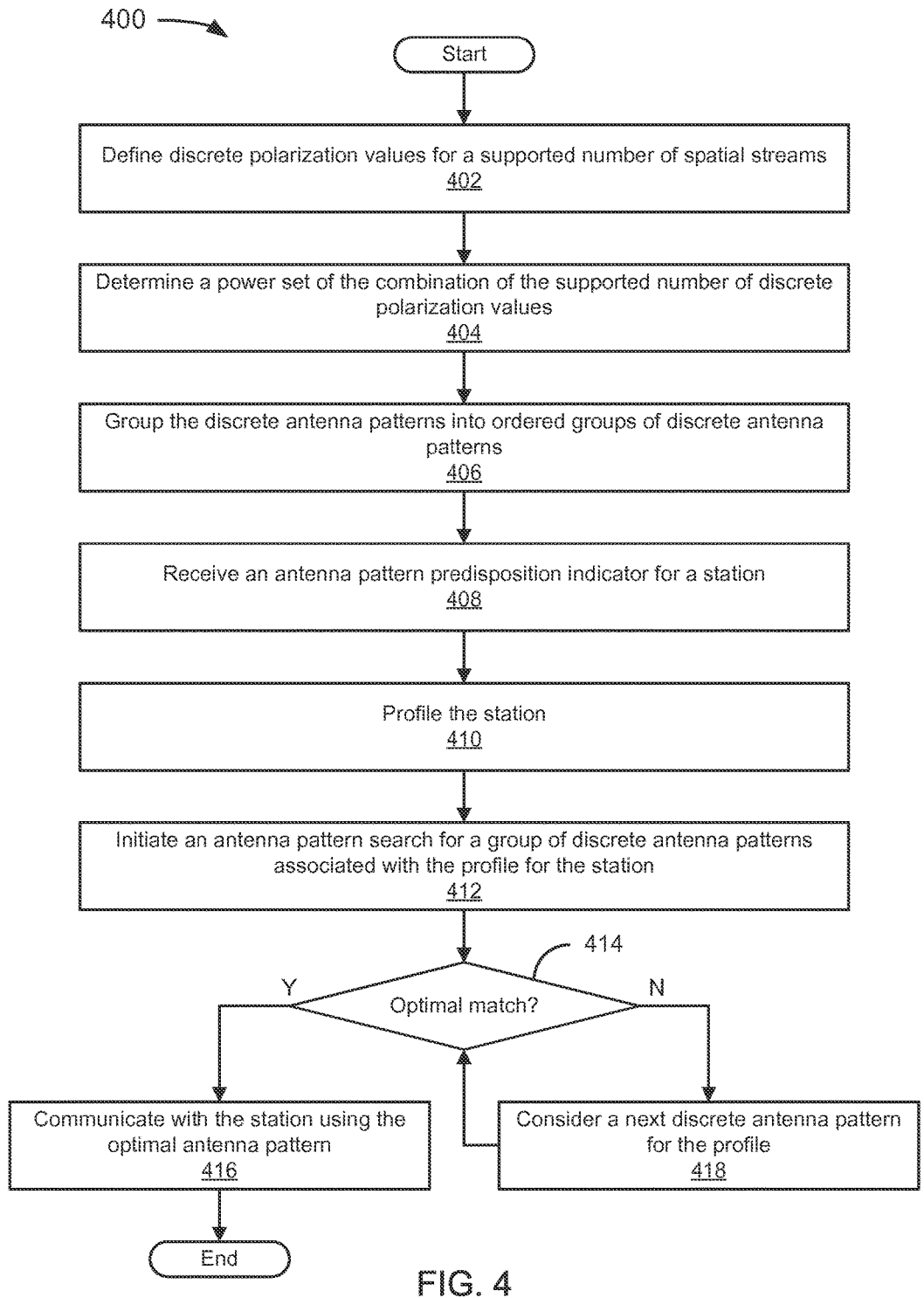
FIG. 4 depicts a flowchart of an example of a method for matching a WAP antenna pattern to a station antenna pattern with an unknown parameter.

FIG. 4 depicts a flowchart 400 of an example of a method for matching a WAP antenna pattern to a station antenna pattern with an unknown parameter. The station can be a wireless device that is coupled to the WAP. In a specific implementation, the WAP has an adaptive array of one or more antennas that can be manipulated to switch between patterns, polarities, or the like. For an array of multiple antennas, spatial and polarization diversity can be exploited. Depending upon the implementation, pattern diversity and transmit/receive diversity can also be exploited. The flowchart 400 and other flowcharts described in this paper can be reordered or reorganized for parallel execution, if applicable. The method can be implemented using the example system shown in FIG. 2.

In the example of FIG. 4, the flowchart 400 starts at module 402 with defining discrete polarization values for a supported number of spatial streams. The supported number of spatial streams can be limited by the capabilities of a system (e.g., a number of antennas in an antenna array), but can generally be selected in light of design parameters for a system. Polarization values can be practically infinite in number, but polarization generally need not be extremely fine because fine-tune matching of polarization has diminishing returns beyond a certain point, which can be selected based upon acceptable design parameters. A 90° polarization mismatch can result in a fairly large dB loss (e.g., −20 dB or worse). A 45° polarization mismatch can result in moderate dB loss (e.g., approximately −3 dB). What is considered acceptable loss will vary depending on design parameters. Even fractional dB loss might be considered unacceptable in some instances.

Consider a specific implementation having a design parameter that defines less than 45° polarization mismatch as unacceptable; the discrete antenna patterns can include polarization values of 120° (maximum), 60° (intermediate), and 0° (minimum). These three discrete values are, in practice, associated with spatial streams. For a single spatial stream, any of the three distinct polarization values are possible. Assuming a given antenna pattern is properly matched, it is not possible to have a 45° polarization mismatch for this specific implementation because the difference between the three discrete antenna polarizations of the antenna pattern is at most 60° (the greatest possible mismatch would be 30° for a spatial stream with polarization midway between any two spatial streams of the discrete antenna pattern).

For an alternative specific implementation of the preceding paragraph, there are three discrete polarization values: 90° (vertical or v-pol), 45° (inclined), and 0° (horizontal or h-pol). (It may be noted that an "undefined" slope is treated as "maximum" slope in this specific implementation, and in general is treated as being a slope with a high value in this paper.) It is expected the maximum slope will correspond to a vertical polarization because of the tendency to refer to vertical polarizations in the industry, but the maximum and minimum slopes can establish another range without deviating from the conceptualization.

In a specific implementation with an antenna pattern with four or more discrete polarization values, the polarization values can be referred to as having maximum, large, small, and minimum values. For example, the maximum, large, small, and minimum values can correspond to 90°, 45°, 0°, and −45°, respectively. Equivalently, the maximum, large, small, and minimum values can correspond to 135°, 90°, 45°, and 0°, respectively.

The polarization values that are implemented correspond to polarizations of antennas that can be matched. An antenna with a polarization that is not in the discrete set of polarizations implemented is treated as if it had a polarization of the closest match. As is understood in the industry, an antenna array of four antennas can match an antenna array of one antenna (MISO or SIMO, depending upon the perspective) or multiple antennas. For any given discrete set of polarizations for an antenna array permutations of antenna patterns can be generated.

In the example of FIG. 4, the flowchart 400 continues to module 404 with determining a power set of a combination of the discrete polarization values for the supported number of spatial streams. Strictly speaking, a power set includes the empty set, but for practical purposes (because the number of spatial streams in each set corresponds to an antenna) the empty set need not be considered a part of the power set (because zero antennas is useless for relevant purposes). A combination of the discrete polarization values is used in lieu of a permutation because an antenna array with two antennas having the same polarization is no better at searching for an antenna pattern match than a single antenna with that polarization. For example, the power set for two discrete polarization values, v-pol and h-pol, is {{v-pol}, {h-pol}, {v-pol, h-pol}}. (Note that the empty set is omitted.)

In the example of FIG. 4, the flowchart 400 continues to module 406 with grouping the discrete antenna patterns into ordered groups of discrete antenna patterns. Here, "discrete antenna patterns" refer to the antenna patterns of the power set of the combination of the discrete polarization values for the supported number of spatial streams. Reference to "a discrete antenna pattern" makes sense in a context in which the comprehensive set of discrete antenna patterns is known. (Outside of the relevant context, a discrete antenna pattern is simply an antenna pattern.) The groups of discrete antenna patterns are ordered in accordance with an optimal antenna pattern search algorithm such that the first discrete antenna pattern is searched first. The second discrete antenna pattern searched is either the next discrete antenna pattern in the group of discrete antenna patterns or some other discrete antenna pattern to which the search algorithm branches based upon results of a first search. Thus, an ordered group can comprise one or more branches. In a specific implementation, the number of spatial streams is generally known before attempting an antenna pattern search. However, if a search is initiated for a first number of spatial streams, but it turns out a station for which the search is initiated has a second number of spatial streams, the algorithm can branch to a different group of discrete antenna patterns with the second number of spatial streams.

One manner of grouping discrete antenna patterns is by the number of discrete polarization values. For example, the power set for two discrete polarization values, v-pol and h-pol, mentioned in the preceding paragraph, can have two groups: {{v=pol}, {h-pol}} and {v-pol, h-pol}. The first group is the group of discrete antenna patterns with one discrete polarization value and the second group is the group of discrete antenna patterns with both discrete polarization values.

Figure 5:
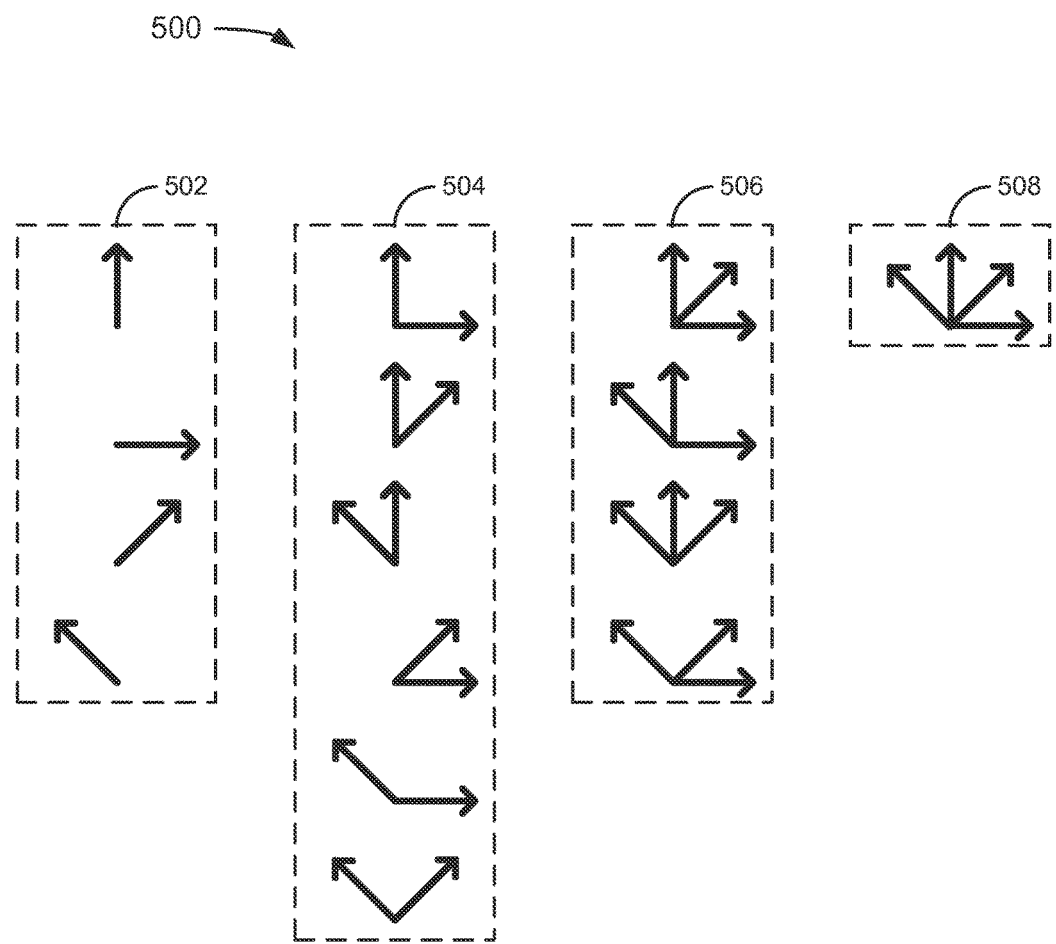
FIG. 5 depicts a diagram of a grouping of antenna patterns for a MIMO (and potentially and applicable degenerate form of MIMO) antenna array comprising four antennas.

FIG. 5 depicts a diagram 500 of a grouping of four spatial streams. The diagram 500 illustrates an example that includes all discrete antenna patterns for up to four spatial streams (using four antennas), with same polarizations reduced to a single spatial stream so that there is no more than one polarization value for a given antenna pattern. For illustrative simplicity, one of the polarizations is vertical (a vertical arrow in the diagram 500), one is horizontal (a horizontal arrow in the diagram 500), and the other two are intermediate (135° and 45° arrows in the diagram 500) or slant ±45° polarizations.

In the example of FIG. 5, the diagram 500 includes four antenna pattern groupings 502, 504, 506, and 508. The antenna pattern grouping 502 includes four spatial stream antenna pattern cases that reduce to a single-stream antenna pattern. The four spatial stream antenna pattern cases include a vertical, horizontal, and two intermediate polarizations. These spatial stream antenna pattern cases would match an antenna pattern of up to four antennas, where the up to four antennas have polarizations closest to the relevant spatial streams. When matching a single spatial stream, attempting matches with the antenna pattern grouping 502 would yield a cumulative 25% matching probability, up to 100% match with four attempts.

The antenna pattern grouping 504 includes six spatial stream antenna pattern cases that each reduce to a two-stream antenna pattern. The six spatial stream antenna pattern cases include any two of a vertical, horizontal, and two intermediate polarizations. These spatial stream antenna pattern cases would match an antenna pattern of two to four antennas, where the two to four antennas have polarizations closest to one or the other of the relevant two spatial streams, with at least one of the two to four antennas having polarizations closest to each one of the relevant two spatial streams. When matching a single spatial stream, attempting matches with the antenna pattern grouping 504 would yield a 50% matching probability on one attempt and a 100% probability with two attempts (assuming a second pattern of the group has no polarizations that are the same as the first pattern that was attempted).

The antenna pattern grouping 506 includes four spatial stream antenna pattern cases that each reduce to a three-stream antenna pattern. The four spatial stream antenna pattern cases include all but one of a vertical, horizontal, and two intermediate polarizations. These spatial stream antenna pattern cases would match an antenna pattern of three or four antennas, where the three or four antennas have polarizations closest to one of the relevant three spatial streams, with at least one of the three or four antennas having polarizations closest to each one of the relevant three spatial streams.

The antenna pattern grouping 508 includes a spatial stream antenna pattern case that includes each of a vertical, horizontal, and two intermediate polarizations. This spatial stream antenna pattern case would match an antenna pattern of four antennas, where the four antennas have polarizations closest to every one of the relevant four spatial streams. The four spatial stream pattern of antenna pattern grouping 508, if the pattern is selected initially, will have a 100% chance of matching one spatial stream optimally with a single attempt because a single spatial stream must optimally match one of the four discrete polarizations. (It may be noted that a single spatial stream could at least in theory fall exactly between two polarizations of the antenna pattern, in which case either of the two adjacent polarizations could be considered an optimal match.)

Other than for single spatial streams, optimally matching an unknown antenna pattern with one try requires some luck. It may be noted, however, that optimally matching two spatial streams (eventually) can be accomplished by attempting matches within antenna pattern grouping 504 and optimally matching three spatial streams (eventually) can be accomplished by attempting matches within antenna pattern grouping 506.

In a specific implementation with an antenna pattern with five or more discrete antenna polarizations a station can have, the polarization values can be referred to as having maximum, large, intermediate, small, and minimum slopes. In a specific implementation, the discrete antenna polarization values can include maximum, minimum, and 'n' intermediate slopes, where 'n' is a non-negative integer. As 'n' approaches ∞, the maximum value approaches 180°, where the minimum value is defined as 0° (horizontal).

Adjacent ones of the discrete antenna polarizations may or may not be separated by the same amount. For example, the difference between a maximum polarization angle and an intermediate polarization angle and the difference between an ("the" if the example is of a pattern with three spatial streams) intermediate polarization angle and a minimum polarization angle are the same.

Referring once again to the example of FIG. 4, the flowchart 400 continues to module 408 with receiving an antenna pattern predisposition indicator from a station. In a specific implementation, the antenna pattern predisposition indicator is data sufficient to identify a characteristic of an antenna pattern. For example, a station can send a MAC address that is known to (or from which information can be derived by) a receiving device, such as a WAP, either at the device or through the device using an off-device agent, such as an authentication server, controller, or other apparatus. As another example, the station could provide a proprietary or standards-compliant antenna pattern predisposition indicator to enable the station to be identified as a laptop device, a mobile phone, or some other device; by brand; or by capability (e.g., 1×1, 2×2, 3×3, 4×4, . . . MIMO-capable). Alternatively, a receiving station could initially beacon (e.g., broadcast) a predilection for serving a particular profile of stations, which would presumably result in a larger number of stations with that particular profile attempting to authenticate through the receiving station. In this alternative, an authentication request (or other message) from a station can itself be treated as an antenna pattern predisposition indicator.

In the example of FIG. 4, the flowchart 400 continues to module 410 with profiling the station. A station can be profiled as part of an authentication procedure. Information about the station is typically stored at a WAP with which the station attempts to authenticate and may or may not be stored further upstream, as well. In a specific implementation, profiling a station involves determining a profile into which a station fits with a highest probability, which may or may not simply be a default profile when the antenna pattern predisposition indicator provides relatively little applicable information. The profile can be characterized as a "preliminary" profile prior to attempting to search for an optimal antenna pattern for the station.

A station that has authenticated previously or is associated with a user account may have associated data that facilitates production of an accurate profile of the station. A profile that has been applied to a station before can be characterized as a "historical" profile because it was presumably a good profile before. Historical profiles can help determine an optimal antenna pattern by, for example, identifying a difference between polarities of two antennas on a station with a two-antenna antenna array. Specifically, if a station previously matched an optimal antenna pattern that had two associated spatial streams with polarities 90° different from one another, an antenna pattern with two spatial streams with polarities 90° different from one another is a good first antenna pattern candidate. It may be the case that the antennas are now oriented differently (as is frequently the case for mobile devices as they are moved), but that the historical profile is known will typically facilitate a faster optimal antenna pattern match by offering an intelligent starting point and identifying a relevant number of spatial streams (two in this example) that are likely to be employed.

The WAP can determine a characteristic of an antenna pattern of the station by looking up a MAC address of the station. Alternatively, the WAP could determine some other characteristic about a device and deduce an antenna pattern characteristic. For example, if a station provides an antenna pattern predisposition indicator that enables the station to be identified as a laptop device, the WAP may assume a certain antenna pattern characteristic to speed a search for an optimal match (e.g., two spatial streams, one h-pol and one v-pol, if that is the most common laptop configuration). A station could identify itself as a mobile phone, in which case the WAP may know that a single spatial stream is most likely. A station could identify itself as a specific brand of a device, with a known antenna pattern characteristic. Stations that provide data sufficient to enable the WAP to profile the station with improved probability over a baseline (e.g., an arbitrary guess) can have a profile that is characterized as an "instructive" profile.

In some cases, the WAP might not have sufficient data to successfully deduce an antenna pattern characteristic from the antenna pattern predisposition indicator, and can instead match the station to a "common denominator" antenna pattern that is selected for the purpose of providing the best starting point in an optimal antenna pattern search. In a specific implementation, the common denominator antenna pattern is always the starting point in an optimal antenna pattern search, and the antenna pattern predisposition is incorporated later or not at all.

In the example of FIG. 4, the flowchart 400 continues to module 412 with initiating an antenna pattern search for a group of discrete antenna patterns associated with the profile for the station. In a specific implementation, the common denominator antenna pattern is one that includes each of the discrete polarizations that can make up a discrete antenna pattern. For example, referring briefly to the example of FIG. 5, the antenna pattern grouping 508 illustrates a set of a single element having an antenna pattern with each of the discrete polarizations that can make up a discrete antenna pattern, given the parameters of the example. An advantage of the common denominator antenna pattern is that it optimally matches a single spatial stream (e.g., a pattern similar to group 502 of FIG. 5) 100% of the time. A historical profile (or instructive profile) will not necessarily result in an improved search for a station with a one-antenna antenna array because changing the orientation of the device can change the polarization of the antenna. Accordingly, a common denominator antenna pattern can be selected in lieu of attempting to match the historical profile.

A two-antenna antenna array can have an antenna pattern that does not necessarily optimally match in one attempt. Consider a station with a v-pol antenna and an h-pol antenna. The common denominator antenna pattern optimally matches the v-pol antenna and the h-pol antenna, resulting in an optimal match with a single attempt. An advantage of the common denominator antenna pattern is that it optimally matches two spatial streams 50% of the time (e.g., when the spatial streams have a pattern similar to group 504 of FIG. 5).

In the example of FIG. 4, the flowchart 400 continues to decision point 414 with determining whether there was an optimal antenna pattern match. If it is determined that there was an optimal antenna pattern match (414-Y), such as after a common denominator match to a single spatial stream antenna pattern, then the flowchart 400 continues to module 416 with communicating with the station using the optimal antenna pattern. If, on the other hand, it is determined that there was not an optimal antenna pattern match (414-N), then the flowchart 400 continues to module 418 with considering a next discrete antenna pattern for the profile 418.

It may or may not be advantageous to use the common denominator antenna pattern for a profile that can result in failure to find an optimal antenna pattern after a first attempt. An advantage of the common denominator antenna pattern is that it optimally matches two spatial streams 100% of the time with two attempts. (As was previously mentioned, the common denominator antenna pattern can also optimally match two spatial streams 50% of the time with one attempt.) Consider a station that takes advantage of spatial diversity, but not of polarization diversity (e.g., an antenna array can have two v-pol antennas). The common denominator antenna pattern matches one of the spatially diverse antennas (and the other spatial streams are not optimally matched). If it is known from the station's profile that the station has two antennas, or this can otherwise be determined using spatial diversity or other techniques, and one antenna is matched using the common denominator antenna pattern, by changing one of the non-matching antennas at, e.g., a WAP to have the same polarization results in an optimal antenna pattern match. Thus, a station with a two-antenna antenna array can be optimally matched on a first attempt half the time (for polarity-diverse antennas) and on a second attempt half the time (for same-polarity antennas). In theory, the flowchart 400 can loop through decision point 414 and module 418 until an optimal match is found. However, it may be noted that the purpose of profiling the station is intended to reduce the number of attempts.

A historical profile can improve the search for a station with a two-antenna antenna array. If the antennas have different polarizations, the common denominator will optimally match 100% of the time on a first attempt. However, if the antennas have the same polarizations, the common denominator will not optimally match on the first attempt. Accordingly, if a historical profile (or instructive profile) is known, the algorithm can use a different initial antenna pattern. For example, an antenna pattern with two v-pol, an h-pol, and an intermediate polarization can be attempted for a first match. Because the historical profile (or instructive profile) has indicated that the two antennas of the antenna array have the same polarization, the initial antenna pattern can optimally match with a single attempt 25% of the time. If the h-pol or intermediate polarizations match, a single antenna of the WAP can be adjusted to match the antenna pattern. If calculations suggest that a negative intermediate polarization (represented as a 135° angle arrow in the example of FIG. 5) is appropriate, two antennas can be changed to that polarization for an optimal match. It may be desirable to use the common denominator in lieu of the antenna pattern with two v-pol (or other polarization) values because it may or may not be difficult to determine whether a polarization that is not represented in the initial pattern (e.g., the 135° angle arrow in the example of FIG. 5) is the optimal match. The advantage of using the historical (or instructive) profile results in an improvement of 50% (optimal match with first attempt) and 50% (optimal match with second attempt) to 62.5% (optimal match with first attempt) and 37.5% (optimal match with second attempt). The odds can be further improved if a best guess for polarizations (e.g., when the polarizations of the station are the same) gives better than 25% chance of hitting, assuming an implementation with four discrete spatial streams.

Advantageously, for multiple spatial streams up to and including the supported number of discrete polarization values, starting with the common denominator will result in a 100% optimal match with a single attempt for multiple polarity-diverse antennas. For spatial streams up to and including the supported number of discrete polarization values, starting with the common denominator will result in a 100% optimal match with two attempts (one attempt for a single spatial stream) for multiple same-polarity antennas, assuming it is determined the antennas have the same polarization.

In a specific implementation, the antenna pattern search is conducted in a manner that depends upon knowledge about the MIMO capabilities of a station. When a station has been profiled to provide such knowledge, the search algorithm can be modified to search groups that depend upon the MIMO capabilities. Assume three discrete spatial streams (say, vertical, slanted, and horizontal), grouped into three antenna pattern groups: A (all-same spatial streams, e.g., {vertical, vertical, vertical}), B (two same spatial streams, e.g., {vertical, vertical, horizontal}), and C (all different spatial streams, e.g., {vertical, slanted, horizontal}).

In order to quickly match a station to an optimal antenna pattern, defined as having maximum gain from either one or both polarization match and a summation of signals from antennas (because $y=h1*x1+h2*x2+h3*x3$), the search algorithm is set to consider set A first (then C, as a baseline and last resort) if the station is known to have 1×1 MIMO capabilities. As should be clear from the parameters of this example, searching group A takes at most three attempts (e.g., search {vertical, vertical, vertical}, {slanted, slanted, slanted}, and {horizontal, horizontal, horizontal} in any order), with a fourth search for what could be characterized as an error or inability to find a match.

In order to quickly match a station to an optimal antenna pattern defined as having maximum gain from either one or both polarization match and a summation of signals from, the search algorithm is set to consider set A first, then set B (and finally C, as a baseline and last resort) if the station is known to have 2×2 MIMO capabilities. Set A can be searched first because it is the smallest group that offers the maximum gain if it matches (3 patterns in this example). It should be clear from the parameters of this example, searching group A can fail to result in an optimal match for a 2×2 MIMO station with two antennas having different polarizations. Accordingly, in cases in which two antennas of the station have different polarizations, a search using group B commences, which should result in an optimal pattern match for different-polarity antennas of a station. Within the parameters of this example, group B can be defined as three combinations, which is, advantageously, significantly smaller in number than a permutation. Thus, in a worst case, within the parameters of this example, a 2×2 MIMO station can be optimally matched in at most three attempts for same-polarity antennas and at most six attempts for different-polarity antennas. As with 1×1 MIMO antenna pattern searching, a final search using set C can be characterized as an error or inability to find a match.

Alternatively, if the polarization of a station's antennas is known or can be predicted at greater than even odds initially, the search described in the preceding paragraph can be improved. If polarization is the same for the two antennas, an optimal search order is set A, then set B (and then, optionally, set C), as described previously. If polarization is different for the two antennas, an optimal search order is set B, then set C, and then set A; set B has the highest probability of optimally matching, and set C has the second greatest gain with the smallest set of patterns within the parameters of this example. An informative profile (e.g., whether the station is a laptop, and the probability that a laptop will have same-polarity or different-polarity antennas if capable of 2×2 MIMO) can make this alternative even more powerful.

In order to quickly match a station to an optimal antenna pattern, defined as having a maximum gain from either or both polarization match and a summation of signals from, the search algorithm is set to consider set A first, then set B (and finally C, as a baseline and last resort) if the station is known to have 3×3 MIMO capabilities. If it can be assumed two of the three antennas will have the same polarization, as is the case for most laptops, the search order should be set B first and the second search order will depend upon the number of discrete polarizations, n. If n=3, set C will have only one pattern and should be searched next. If n=4, set C will have the same number of patterns as set A, but A may be the more probably pattern to match; so set A should be searched next (if set C is a highly probably candidate, set C could be searched next instead, even if n=4).

Currently, 4×4 MIMO solutions often use the fourth spatial stream to improve reliability and range. Groupings of antenna patterns, such as illustrated in the example of FIG. 5, can be used in a manner similar to the example just described, but for 4×4 MIMO as long as the spatial streams are matched to spatial streams of stations. It is less likely for a station to have a 4×4 MIMO antenna array, but as long as the increased cost associated with 4×4 MIMO does not interfere with adoption, stations are not unlikely to implement it. Unfortunately, battery resources are consumed more rapidly with 4×4 MIMO, making it unlikely that smart phones will have 4×4 MIMO capability in the near future, at least on any widely adopted scale. (That is, there may be no difficult technological barriers, but there may be practical ones.) With the practical limitations in mind, it may be desirable for a WAP to use 4×4 MIMO with stations that match an instructive profile of a smaller number of expected spatial streams by using group 508 (see FIG. 5) initially, which has previously been referred to in this paper as the common denominator. It is reasonably likely 5×5 MIMO will become readily available before long. When it does, starting with the common denominator may become even more advantageous.

Figure 6:
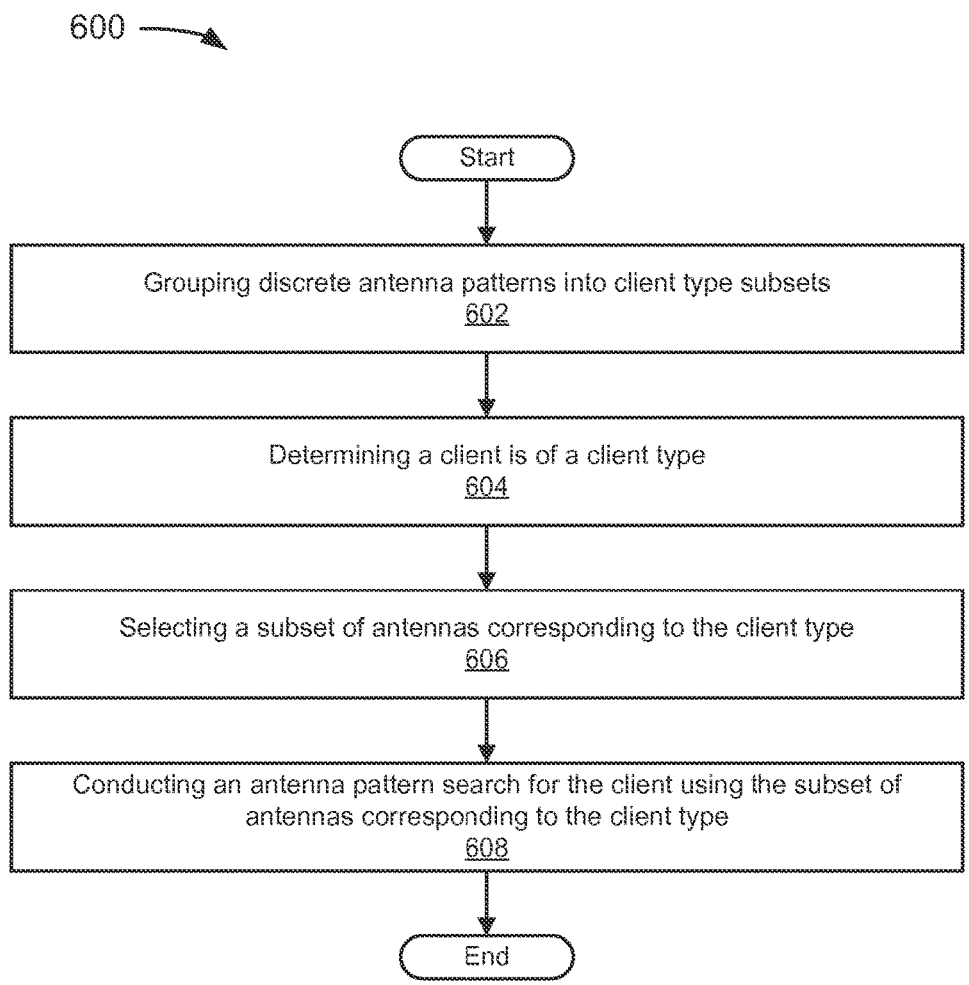
FIG. 6 depicts a flowchart of an example of a method for antenna pattern matching at a WAP.

FIG. 6 depicts a flowchart 600 of an example of a method for antenna pattern matching at a WAP. The example of FIG. 6 can be implemented using the example system shown in FIG. 2. In the example of FIG. 6, the flowchart 600 starts at module 602 with grouping discrete antenna patterns into station antenna pattern profiles. Discrete antenna patterns are all combinations of discrete spatial streams that can make up an antenna pattern recognized by the WAP. The WAP groups combinations of antennas that form different antenna patterns, into station antenna pattern profiles that can each associate with or define a particular station type. Station antenna pattern profiles can define a particular station type by degree of MIMO capability (e.g., 1×1, 2×2, etc.) and potentially by other capabilities or characteristics, such as spatial stream characteristics. The spatial stream characteristics can include the frequency bandwidths of the spatial streams. Station antenna pattern profiles can also define a station by one or more discrete antenna polarization values for the station.

In the example of FIG. 6, the flowchart 600 continues to module 604 with determining a station is of a station type. Station types can be determined from a historical profile or account, or they can be profiled "on the fly" as a station communicates with the WAP. A station can be profiled by using data provided by the station (e.g., by receiving a station type identifier or an antenna pattern predisposition indicator from the station) or derived from the communication with the station (e.g., by deriving station type from an indirect antenna pattern predisposition indicator).

In the example of FIG. 6, the flowchart 600 continues to module 606 with selecting an antenna pattern group corresponding to the station type. The selection is to provide a fast, optimal antenna pattern match.

In the example of FIG. 6, the flowchart 600 continues to module 608 with conducting an antenna pattern search for the station using the antenna pattern group corresponding to the station type. The WAP may or may not follow a special sequence of antenna patterns in the antenna pattern group corresponding to the station type to do the search.

Convergence time can be shortened when using an RSSI-assisted antenna pattern search algorithm. Because RSSI is known prior to sending a first training packet, and because of the strong correlation between the RSSI and data rate, an initial data rate can be selected based on RSSI. Using default antennas for initial training can help to narrow the search range. This technique can be implemented using a lookup table listing RSSI and data rate.

Figure 7:
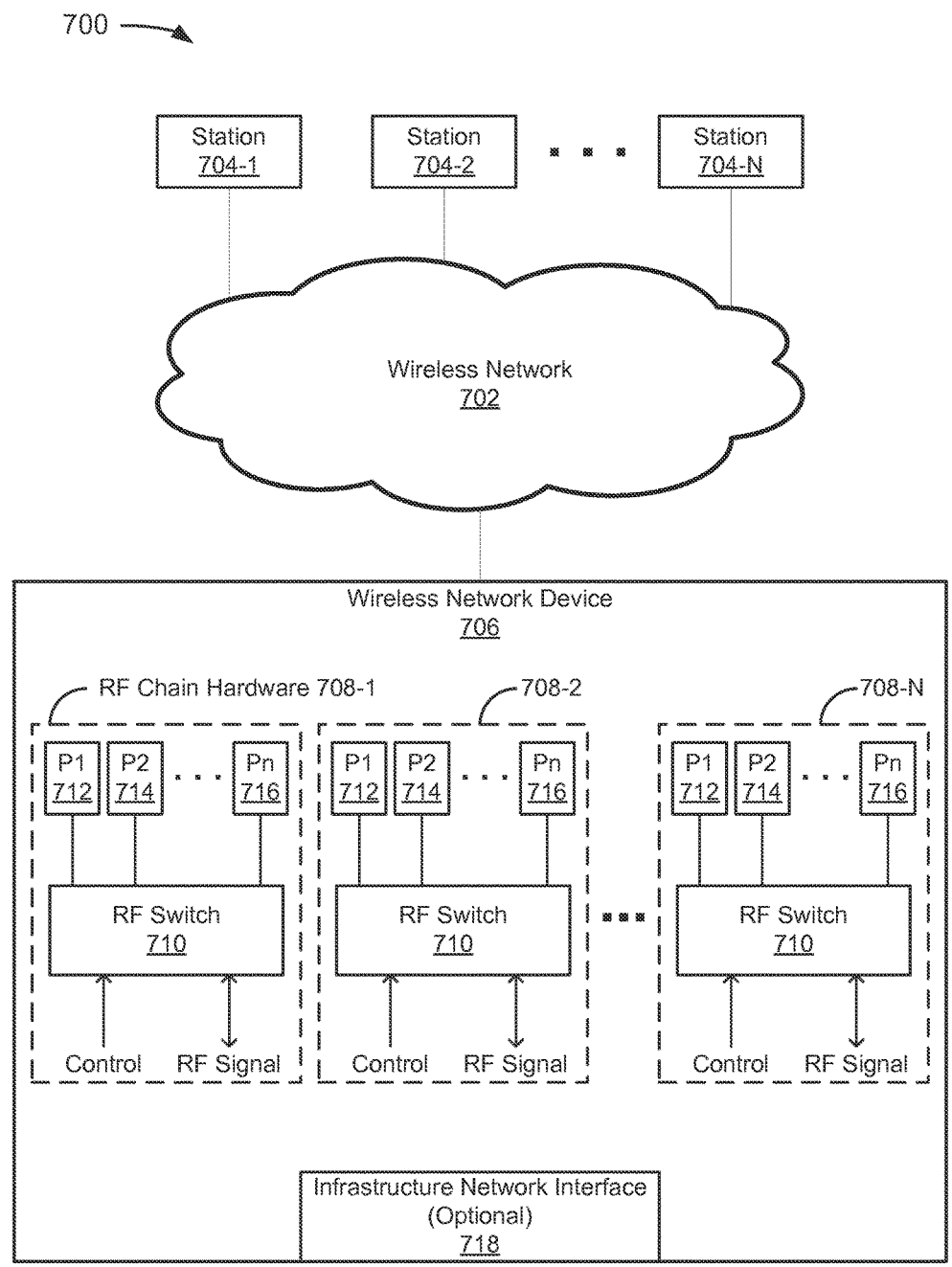
FIG. 7 depicts a diagram of an example of a wireless network system with a smart antenna wireless network device.

FIG. 7 depicts a diagram 700 of an example of a wireless network system with a smart antenna wireless network device. In the example of FIG. 7, the diagram 700 includes a wireless network 702, stations 704-1 to 704-N (collectively referred to as "the stations 704") coupled to the wireless network 702, and a wireless network device 706 coupled to the wireless network 702.

In the example of FIG. 7, the wireless network 702 is intended to represent a wide variety of applicable wireless network technologies. As used herein, a wireless network refers to any type of wireless network, including but not limited to a structured network or an ad hoc network. Data on a wireless network is often encrypted. However, data may also be sent in the clear, if desired. With encrypted data, a rogue device will have a difficult time learning any information (such as passwords, etc.) from clients before countermeasures are taken to deal with the rogue, assuming countermeasures are necessary.

The wireless network 702 may or may not be IEEE 802.11-compatible. In this paper, 802.11 standards terminology is used by way of relatively well-understood example to discuss implementations that include wireless techniques. For example, a station, as used in this paper, may be referred to as a device with a media access control (MAC) address and a physical layer (PHY) interface to a wireless medium that complies with the IEEE 802.11 standard. Thus, for example, stations and a wireless access point (WAP) with which the stations associate can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In a specific implementation, the wireless network 702 includes a WLAN. Administrative control of a WLAN may or may not include ownership of hardware for an implementation that includes offering computing resources as a service. In a specific implementation, the wireless network 702 includes or is coupled to a cloud network.

In the example of FIG. 7, the stations 704 can be implemented as stations in an infrastructure network or an ad hoc network. The stations 704 can be referred to as being "on" or "in" the wireless network 702. Stations can include a computer system with a wireless network access interface.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 701), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

In the example of FIG. 7, the wireless network device 706 can be implemented as a station, such as an access point. In the example of FIG. 7, the wireless network device 706 includes RF chain hardware 708-1 to 708-N (collectively referred to as "the RF chains 708") and an optional infrastructure network interface 718. The wireless network device 706 may or may not include additional components such as, for example, an integrated preamplifier or mixer, reflective or directive elements or surfaces (e.g., parasitic elements, parabolic reflectors or horns that serve to direct electromagnetic beams or other desired radiation pattern, etc.), or the like.

In the example of FIG. 7, the infrastructure network interface 718 can be coupled to a network having practically any applicable type of communications network, including the Internet. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, the network can include, for example, a wide area network (WAN), metropolitan area network (MAN), campus area network (CAN), or local area network (LAN), but the network could at least theoretically be of any size or characterized in some other fashion (e.g., personal area network (PAN) or home area network (HAN), to name a couple of alternatives). In a specific implementation in which the wireless network device 706 is part of an ad hoc network, the infrastructure network interface 718 may be unused, used to couple to a network other than an infrastructure network, or omitted.

Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet. The example of FIG. 7 is intended to illustrate a network that may or may not include more than one private network. In specific implementations, the network can be implemented as a WAN, public switched telephone network (PSTN), cellular network, or some other network or combination of similar or different networks capable of coupling two private networks.

Although the RF chains 708 are depicted as distinct, it should be understood that certain hardware can be shared by more than one of the RF chains 708. (Some hardware cannot be used simultaneously by multiple RF chains, however.) In a specific implementation, the RF chains 708 are configured to turn electrical signals into electromagnetic (e.g., RF) waves, and vice versa.

In the example of FIG. 7, the RF chains 708 include an RF switches 710, "polarization 7" (P1) antennas 712, P2 antennas 714, and Pn antennas 716. The "n" of "Pn" is intended to illustrate that the antennas can include "n" polarizations, which can vary by implementation. In a specific implementation, n=4. Consider as an example, P1 can correspond to horizontal polarization, P2 to vertical, P3 to 45 degree, and P4 to −45 degree.

RF switches 710 can be implemented in using applicable convenient techniques. For example, the RF switch could include an SP4T RF switch. As another example, in a dual band radio context, additional logic, such as a CPLD could receive input from radio GPIO to control an RF switch for either a 2 GHz or 5 GHz chain. (A dual band radio chain can be treated as a single RF chain.) The RF switches 710 receive a control input that causes the RF switches 710 to switch between antenna inputs and pass RF signal to and from the antennas as specified. A transmit/receive switch can be considered part of the RF switches 710 or as a separate component that switches in accordance with whether RF chains are in transmit or receive mode.

In specific implementations, the antennas 712-716 include a rigid metallic structure that is sometimes referred to as an "antenna," a wire form structure that is sometimes referred to as an "aerial," or some other applicable structure. In this paper, "aerials," "antennas," and other structures with applicable functionality are referred to as antennas. The antennas 712-716 may or may not include (or could be characterized as including) a support structure, enclosure, or the like.

In a specific implementation, the antennas 712-716 include an arrangement of metallic conductors ("elements"), electrically connected to a receiver or transmitter. An oscillating current of electrons forced through the antenna by a transmitter will create an oscillating magnetic field around the elements, while the charge of the electrons also creates an oscillating electric field along the elements. These time-varying fields, when created in the proper proportions, radiate away from the antenna into space as a moving transverse electromagnetic field wave. Conversely, during reception, the oscillating electric and magnetic fields of an incoming radio wave exert force on the electrons in the elements, causing them to move back and forth, creating oscillating currents in the antennas. In a specific implementation, the antennas 712-716 include a directional or high gain antenna. In another specific implementation, the antennas 712-716 include an omnidirectional antenna.

The antennas 712-716 can include separate antenna arrays for transmission and reception of radio signals, or can include an antenna array that is used for both transmission and reception of radio signals. As used in this paper, an antenna array is intended to include one or more antennas. (An antenna array with one and only one antenna can alternatively be referred to as "an antenna array," "an antenna," or "an antenna array with one antenna.") In transmission, a radio transmitter supplies an oscillating radio frequency electric current to terminals of the antennas 712-716, and the antennas 712-716 radiate the energy from the current as electromagnetic waves. In reception, the antennas 712-716 intercept power of an electromagnetic wave and produce a voltage at the terminals, which is applied to a receiver to be amplified.

In a specific implementation, antenna arrays on radio frequency (RF) chains 708 have associated polarizations. The mounting locations of antennas of the antenna array can be separated to add spatial diversity and directed to cause peak gains in different directions from one another. By selecting different combinations of diversities in polarization, space, and gain, MIMO stream de-correlation can be improved and a received signal strength indicator (RSSI) can be increased in a downlink direction.

In a specific implementation, a first polarization of an antenna array defines an orientation of an electric field (E-plane) of a radio wave with respect to the Earth's surface and is determined by the physical structure of the antenna(s) of the antenna array and by an orientation of the antenna(s). It has not related to antenna directionality terms (e.g., "horizontal", "vertical", and "circular" in an antenna directionality context). Thus, a simple straight wire antenna will have one polarization when mounted vertically, and a different polarization when mounted horizontally.

Polarization is the sum of the E-plane orientations over time projected onto an imaginary plane perpendicular to the direction of motion of the radio wave. In the most general case, polarization is elliptical, meaning that the polarization of the radio waves varies over time. Two special cases are linear polarization (the ellipse collapses into a line) and circular polarization (in which the two axes of the ellipse are equal). In linear polarization the antenna compels the electric field of the emitted radio wave to a particular orientation. Depending on the orientation of the antenna mounting, the usual linear cases are horizontal and vertical polarization. In circular polarization, the antenna continuously varies the electric field of the radio wave through all possible values of its orientation with regard to the Earth's surface. Circular polarizations, like elliptical ones, are classified as right-hand polarized or left-hand polarized using a "thumb in the direction of the propagation" rule. Optical researchers use the same rule of thumb, but pointing it in the direction of the emitter, not in the direction of propagation, and so are opposite to radio engineers' use.

Figure 8:
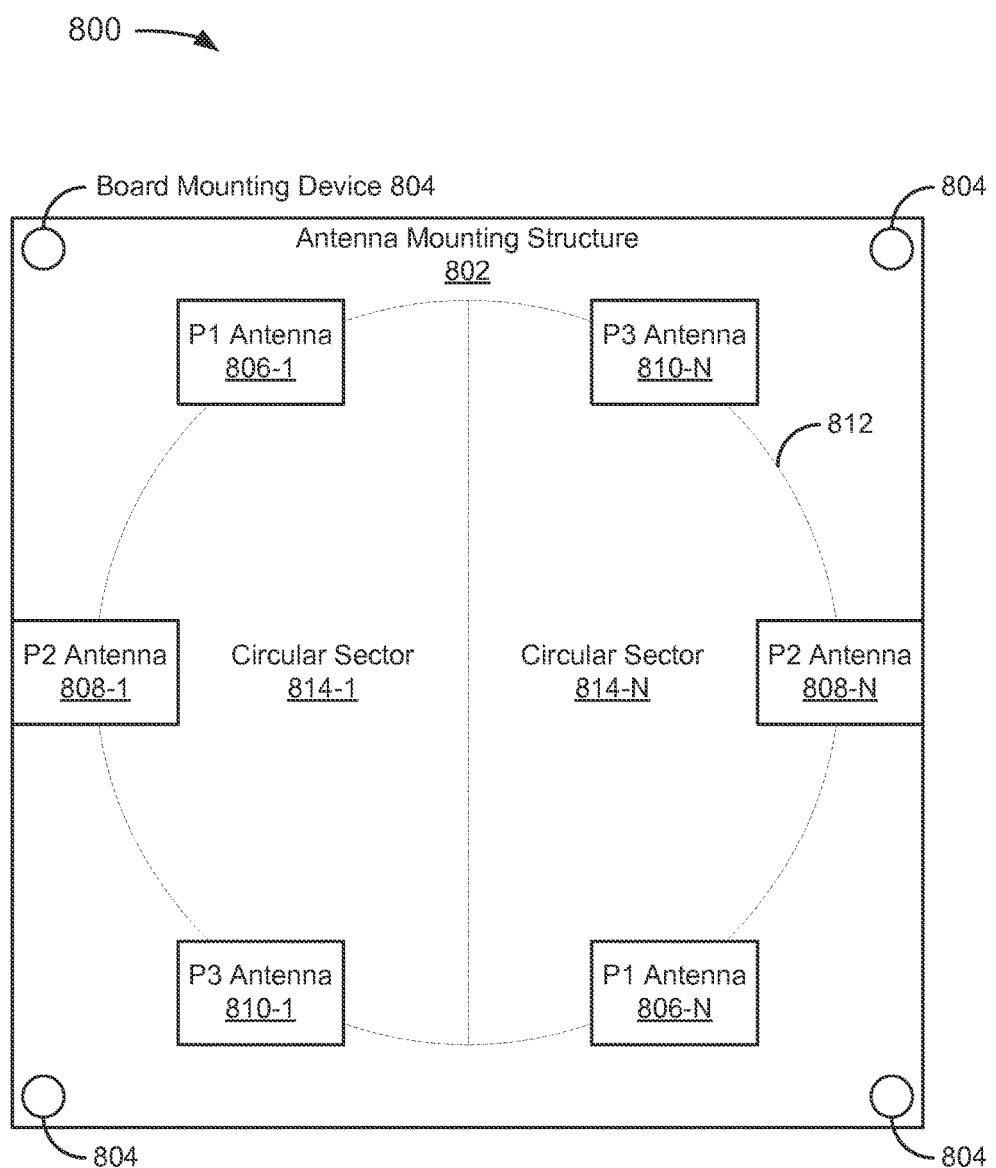
FIG. 8 depicts a diagram of an example of an antenna board with spatially diverse antennas.

Advantageously, the antennas 712-716 can be organized to maximize spatial diversity. FIG. 8 depicts a diagram 800 of an example of an antenna board with spatially diverse antennas.

The diagram 800 includes an antenna mounting structure 802 with a board mounting device 804, P1 antennas 806-1 to 806-N (collectively referred to as P1 antennas 806), P2 antennas 808-1 to 808-N (collectively referred to as P2 antennas 808), P3 antennas 810-1 to 810-N (collectively referred to as P3 antennas 810). Three polarizations (P1, P2, and P3) are depicted for illustrative purposes only; there could be a different number of polarizations used.

In the diagram 800, the antennas 806-810 are interleaved and positioned over a circle 812. Antenna arrays are organized into groups of P1, P2, and P3 antennas and distributed among circular sectors 814. Two circular sectors (appearing in the example of FIG. 8 as semicircular circular sectors 814-1 and 814-N, referred to collectively as "circular sectors 814") are depicts for illustrative purposes only; there could be a different number of circular sectors used. The circular sectors 814 can be given different names depending upon the central angles that define them, such as quadrants (90°), sextants (60°) and octants)(45°.

In the example of FIG. 8, the antenna mounting structure 802 has a center around which the circle 812 is defined on a plane. In a specific implementation, multiple same-size, non-overlapping, adjacent circular sectors 814 define the area enclosed by the circle. Thus, the circular sectors 814 can, in combination, be characterized as fully covering the area defined by the circle 812. The circle 812 is not intended to exist as a physical hardware component. Rather, the circle 812 is drawn for the purpose of illustrating how the antennas 806-810 fall within circular sectors 814 of the circle 812.

In the example of FIG. 8, the antennas 806-810 are mounted on the antenna mounting structure 802 over the circle 812. In a specific implementation, at least a portion of each of the antennas 806-810 intersect the circle 812 for at least one circle that can be drawn in space. In another specific implementation, each of a plurality of arrays of antennas having different polarizations fall within a single one of the circular sectors 814. It may be noted that other antennas could be attached to the antenna mounting structure 802 other than the antennas 806-810, but such other antennas are ignored for illustrative ease.

The P1 antennas 806 have a first polarization, such as horizontal, vertical, or some other polarization. In a specific implementation, for at least one circle that can be drawn in space, a first subplurality of lines perpendicular to the plane in which the circle 812 is defined extend through respective ones of the P1 antennas 806 and intersect the plane in each circular sector of the plurality of circular sectors. Similarly, a second subplurality of lines perpendicular to the plane extend through respective ones of the P2 antennas 808 and intersect the plane in each circular sector of the plurality of circular sectors and a third subplurality of lines perpendicular to the plane extend through respective ones of the P3 antennas 810 and intersect the plane in each circular sector of the plurality of circular sectors. In general, the number of subpluralities of lines will be equal to the number of polarizations (in this example, the number of polarizations happens to be three).

The board mounting device 804 can be used to attach the antenna mounting structure 802 to a board. Antenna placement can be around a board that is located above (or below) the antenna mounting structure 802. Although the board mounting device 804 is depicted as circles in each corner of the antenna mounting structure 802 (suggesting mounting pegs for attaching an antenna board comprising the antenna mounting structure 802 onto another board), in an alternative implementation, the antenna mounting structure 802 can have a hollow central portion, such as a rectangular portion inside the circle 812 that does not intersect any of the antennas 806-810, the edges of which are attached to another board, such as a control board, radio board, or main board. The board mounting device can, in such an implementation, be characterized as the material used to connect the antenna mounting structure 802 to the board located within the circle 812.

Figure 9:
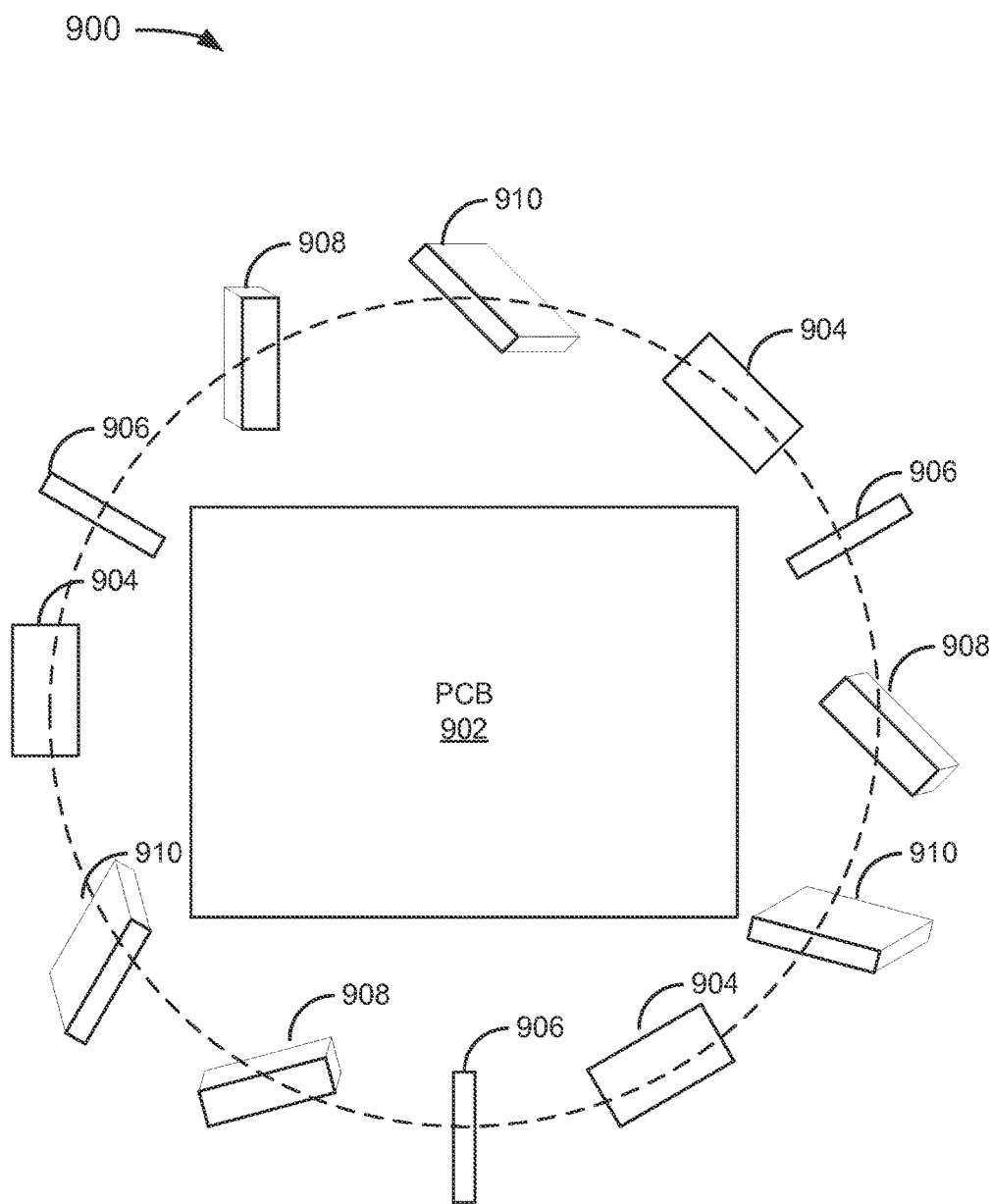
FIG. 9 depicts a diagram of an example of a wireless network device with antennas mounted around a printed circuit board (PCB) edge in a circular manner.

FIG. 9 depicts a diagram 900 of an example of a wireless network device with antennas mounted around a printed circuit board (PCB) edge in a circular manner. The diagram 900 includes a PCB 902, horizontal-polarity (h-pol) antenna devices 904, vertical-polarity (v-pol) antenna devices 906, 45 degree-polarity (45-pol) antenna devices 908, and −45 degree-polarity (−45-pol) antenna devices 910. Some effort has been made to suggest the angles of the antenna devices 904-910 in diagram 900, but the angles are only for conceptualization of the polarizations of the antennas and should not be treated as actual angles of departure or arrival. The example of FIG. 9 serves to illustrate any of antennas arranged around the PCB 902, whether above, below, or coplanar with (encircling or encompassing) the PCB 902.

Referring once again to the example of FIG. 8, advantageously, the antenna mounting structure 802 can be separated from a main board, radio board, control board, or the like. This separation enables a manufacturer to create the antenna mounting structure 802 (and/or a corresponding antenna board) from materials that are relatively inexpensive relative to the semiconductor materials used for manufacturing printed circuit boards. For example, the antenna mounting structure 802 can be made of fiberglass. In an alternative, the antenna mounting structure 802 is located around a co-planar board, such as a control board. In this alternative, the antenna mounting structure 802 can still be fabricated using less expensive materials, such as fiberglass, than the co-planar board, which may be a PCB.

Referring once again to the example of FIG. 7, the wireless network device 706 can be matched with the stations 704 in accordance with antenna polarization. In a specific implementation, the wireless network device 706 is capable of MIMO.

Figure 10A:
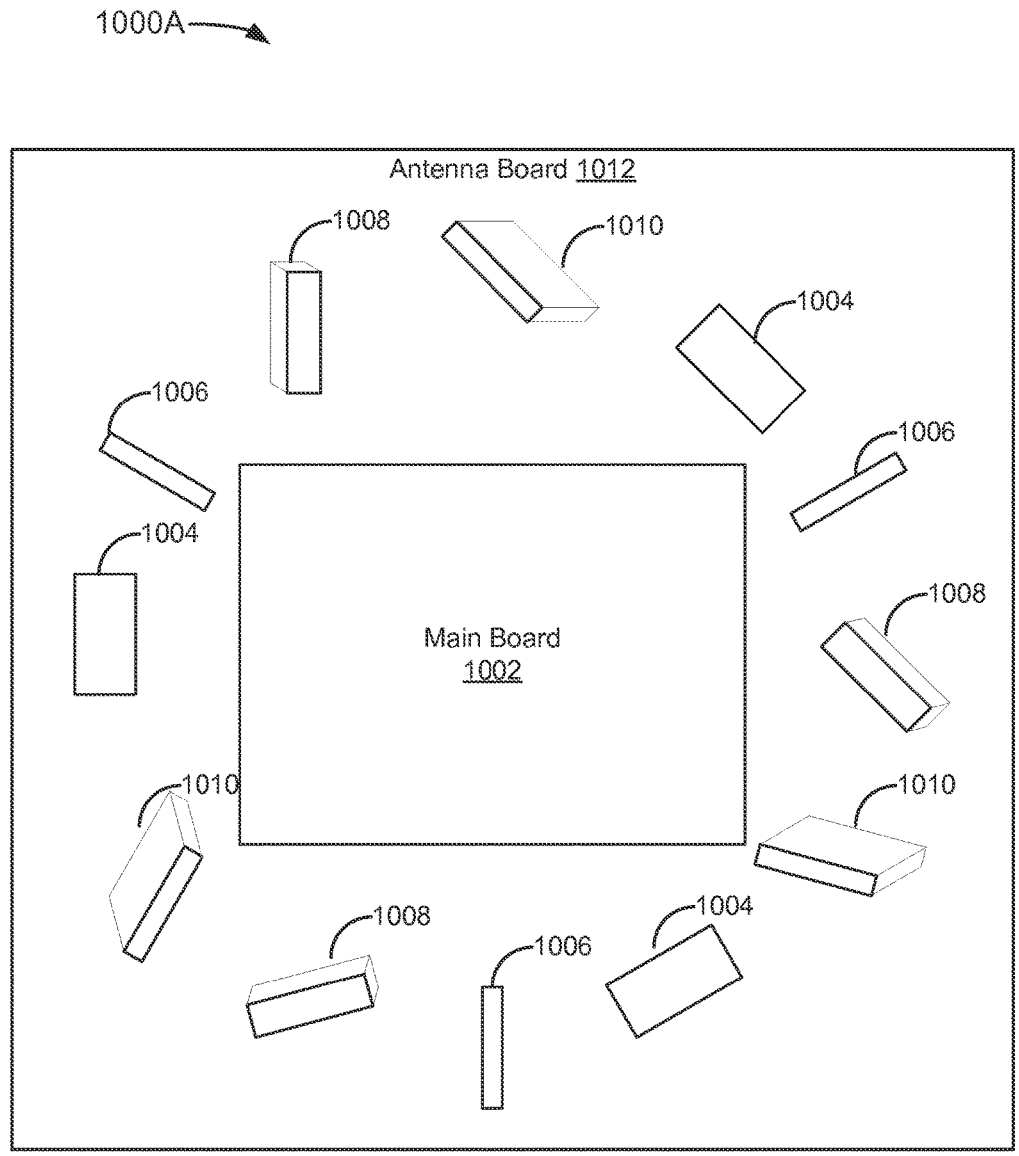
FIGS. 10A and 10B depict top and side view diagrams and of an example of a wireless network device with an antenna board.
Figure 10B:
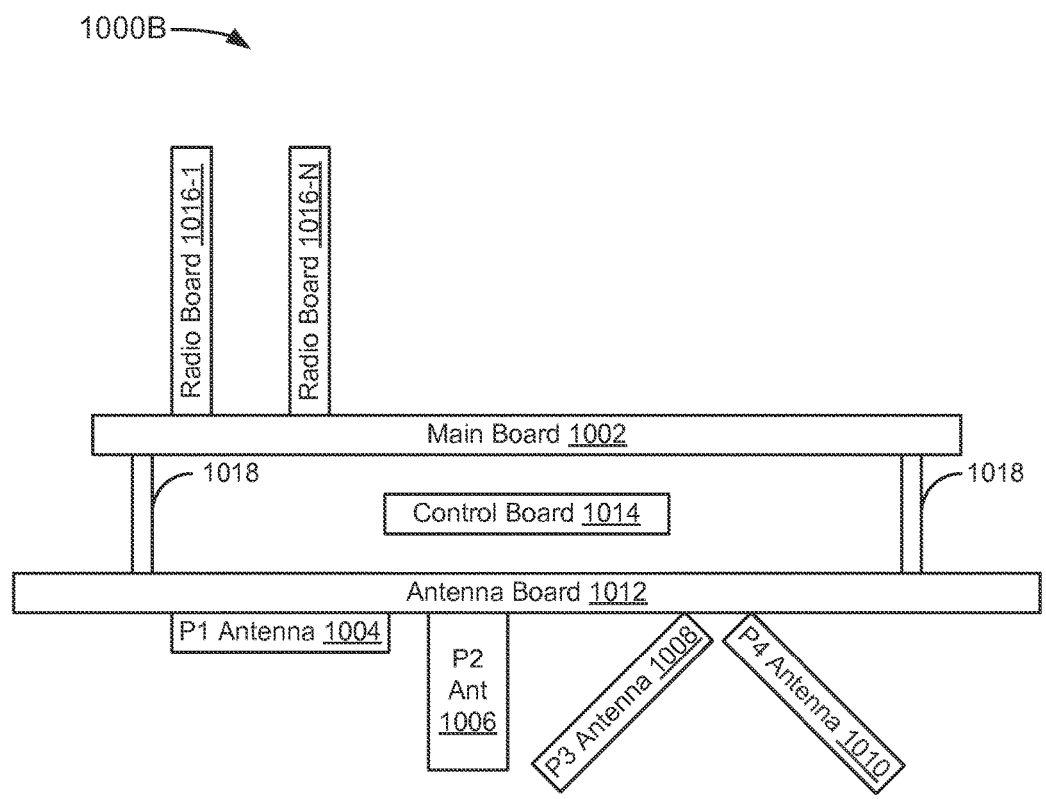

FIGS. 10A and 10B depict top and side view diagrams 1000A and 1000B of an example of a wireless network device with an antenna board. The diagram 1000A is a top view that shows a main board 1002, h-pol antenna devices 1004, v-pol antenna devices 1006, 45-pol antenna devices 1008, −45-pol antenna devices 1010, and an antenna board 1012. The diagram 1000B is a side view that shows the main board 1002, h-pol antenna devices 1004, v-pol antenna devices 1006, 45-pol antenna devices 1008, −45-pol antenna devices 1010, and antenna board 1012. The diagram 1000B also shows a control board 1014, radio boards 1016-1 to 1016-N (referred to collectively as "the radio boards 1016"), and a board mounting device 1018.

In a specific implementation, the control board 1014 is separate from the antenna board 1012 and the main board 1002 because it is convenient, from a manufacturing standpoint, to form the relevant switching circuitry on a separate board. In an alternative implementation, the control board 1014 could be formed between the antennas 1004-1010 on the antenna board 1012. In yet another alternative implementation, the control board 1014 could be formed on the main board 1002.

In a specific implementation, the radio boards 1016 are separate from the antenna board 1012 and the main board 1002. For example, the radio boards 1016 can be "plugged into" the main board 1002 as radio hardware modules. The number of radio boards 1016 is optional, but in a specific implementation, the number of radio boards is equal to the number of bands. For example, a dual-band radio that operates in the 2 GHz and 5 GHz ranges could have a first radio board associated with the 2 GHz band and a second radio board associated with the 5 GHz band. In an alternative implementation, the radio boards 1016 can be plugged into the antenna board 1012 or replaced with radio modules that are formed on the antenna board 1012. In another alternative implementation, the radio boards 1016 can be replaced with radio modules that are formed on, as opposed to plugged into, the main board 1002.

In a specific implementation, the board mounting device 1018 connects the antenna board 1012 to the main board 1002. The control board 1014 may be connected to the antenna board 1012 and/or the main board using similar or different board mounting devices.

Changes from one operational mode to another, transformation of data, and other activities may or may not be accomplished using engines. An engine, as used in this paper, includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor.

These and other examples provided in this paper are intended to illustrate but not necessarily to limit the described embodiments. As used herein, the term "embodiment" means an embodiment that serves to illustrate by way of example but not limitation. The techniques described in the preceding text and figures can be mixed and matched as circumstances demand to produce alternative embodiments.

Proposed additional claims include:

1. A device comprising:
    an antenna mounting structure having a center around which a circle is defined on a first plane;
    a plurality of antenna devices mounted on the antenna mounting structure, including:
        a first subplurality of antenna devices, with a first polarization, including:
            a first antenna device with a first point defined thereon, wherein a first line perpendicular to the first plane intersects the first point and the circle;
            a second antenna device with a second point defined thereon, wherein a second line perpendicular to the first plane intersects the second point and the circle; wherein the second point is a distance from the first point in a clockwise direction along the circle or a projection of the circle into a second plane parallel to the first plane and a third point defined on a third antenna device is the distance from the second point in the clockwise direction along the circle or the projection of the circle into the second plane;
        a second subplurality of antenna devices, with a second polarization different from the first polarization, including:
            a fourth antenna device with a fourth point defined thereon, wherein a third line perpendicular to the first plane intersects the fourth point and the circle;
            a fifth antenna device with a fifth point defined thereon, wherein a fourth line perpendicular to the first plane intersects the fifth point and the circle;
            wherein the fifth point is the distance from the fourth point in a clockwise direction along the circle or a projection of the circle into the second plane and a sixth point defined on a sixth antenna device is the distance from the fifth point in the clockwise direction along the circle or the projection of the circle into the second plane;
    a board mounting device, wherein, in operation, the antenna mounting structure is attached to a board using the board mounting device.

2. The device of claim 22, further comprising:
    an antenna board, wherein the antenna board includes the antenna mounting structure;
    a main board, wherein the main board includes the board;
    a radio board coupled to the main board;
    a control board coupled to the main board and the antenna mounting structure.

3. The device of claim 22, wherein the plurality of antenna devices further comprises a third subplurality of antenna devices with a third polarization different from the first polarization and the second polarization.

4. The device of claim 22, wherein the third antenna device and the first antenna device comprise a single antenna device.

5. The device of claim 22, wherein the sixth antenna device and the fourth antenna device comprise a single antenna device.

6. A wireless device, comprising:
    an antenna mounting structure having a center around which a circle is defined on a plane, wherein a plurality of same-size, non-overlapping, adjacent circular sectors define the area enclosed by the circle;
    a plurality of antenna devices mounted on the antenna mounting structure, including:
        a first subplurality of antenna devices with a first polarization, wherein a first subplurality of lines perpendicular to the plane extend through respective ones of the first subplurality of antenna devices and intersect the plane in each circular sector of the plurality of circular sectors;
        a second subplurality of antenna devices with a second polarization different than the first polarization, wherein a second subplurality of lines perpendicular to the plane extend through respective ones of the second subplurality of antenna devices and intersect the plane in each circular sector of the plurality of circular sectors.

7. The device of claim 27, wherein the antenna mounting structure is made of fiberglass.

8. The device of claim 27, further comprising a board mounting device, wherein, in operation, the antenna mounting structure is attached to a printed circuit board (PCB) using the board mounting device.

9. The device of claim 27, further comprising an antenna board, wherein the antenna board comprises the antenna mounting structure.

10. The device of claim 27, further comprising a main board, wherein the first plurality of lines and second plurality of lines do not intersect an area defined as a vertical projection of the main board onto the plane.

11. The device of claim 31, wherein the plurality of antennas are not vertically aligned with the main board from a top view.

12. The device of claim 31, further comprising an antenna board, wherein the antenna board comprises the antenna mounting structure and wherein the main board and the antenna board are substantially coplanar.

13. The device of claim 31, further comprising a radio module, mounted on the main board, with radio frequency (RF) chain hardware coupled to the plurality of antenna devices, wherein, in operation, the plurality of antenna devices include components that, together with the RF chain hardware, form at least a portion of a plurality of RF chains.

14. The device of claim 27, further comprising a control board.

15. The device of claim 27, further comprising a radio board with radio frequency (RF) chain hardware coupled to the plurality of antenna devices, wherein, in operation, the plurality of antenna devices include components that, together with the RF chain hardware, form at least a portion of a plurality of RF chains.

16. The device of claim 27, wherein the plurality of antenna devices further comprises a third subplurality of antenna devices with a third polarization different from the first polarization and the second polarization.

17. The device of claim 27, wherein the third antenna device and the first antenna device comprise a single antenna device.

18. The device of claim 27, wherein the sixth antenna device and the fourth antenna device comprise a single antenna device.

19. A wireless device, comprising:
a means for mounting antenna devices in interleaved subpluralities of different-polarity antennas around a center such that each of the subpluralities of different-polarity antennas are located at least in part within one of a plurality of non-overlapping circular sectors of a circle defined around the center;
a first subplurality of antenna devices with a first polarization, wherein each of the interleaved subpluralities of different-polarity antennas comprises one of the first subplurality of antenna devices;
a second subplurality of antenna devices with a second polarization, wherein each of the interleaved subpluralities of different-polarity antennas comprises one of the second subplurality of antenna devices.

20. The wireless device of claim 40, further comprising:
a third subplurality of antenna devices with a third polarization, wherein each of the interleaved subpluralities of different-polarity antennas comprises one of the third subplurality of antenna devices;
a fourth subplurality of antenna devices with a fourth polarization, wherein each of the interleaved subpluralities of different-polarity antennas comprises one of the fourth subplurality of antenna devices.

We claim:

1. A method comprising:
grouping discrete antenna patterns into station antenna pattern profiles, wherein a station type is associated with a station antenna pattern profile of the station antenna pattern profiles, the station type being defined by at least one of a degree of multiple-input multiple-output (MIMO) capability, a spatial stream characteristic, and one or more antenna polarization values;
determining a station is of the station type;
selecting an antenna pattern group corresponding to the station type;
conducting an optimal antenna pattern search for the station using the antenna pattern group corresponding to the station type.

2. The method of claim 1, further comprising establishing a finite plurality of discrete polarization values, wherein each discrete antenna pattern of the discrete antenna patterns includes one or more of the discrete polarization values.

3. The method of claim 1, further comprising establishing a finite plurality of discrete polarization values, wherein each discrete antenna pattern of the discrete antenna patterns includes a non-null, non-redundant combination of the discrete polarization values.

4. The method of claim 1, wherein the station type is a defined by the spatial stream characteristic.

5. The method of claim 1, wherein the station type is defined by the one or more antenna polarization values.

6. The method of claim 1, further comprising profiling the station, wherein determining the station is of the station type includes using a result of the profiling.

7. The method of claim 1, further comprising receiving an antenna pattern predisposition indicator from the station, wherein determining the station is of the station type includes using the antenna pattern predisposition indicator.

8. The method of claim 1, further comprising following a subplurality of the antenna pattern group to conduct the optimal antenna pattern search.

9. The method of claim 1, wherein optimal is defined as having an estimated highest gain of any of the other discrete antenna patterns from at least one of polarization matches and summation of signals.

10. The method of claim 1, further comprising:
determining a second station is of a second station type, wherein the second station type is associated with a second station antenna pattern profile of the station antenna pattern profiles;
selecting a second antenna pattern group corresponding to the second station type;
conducting an optimal antenna pattern search for the second station using the second antenna pattern group corresponding to the second station type.

11. The method of claim 1, wherein the station type is defined by the degree of MIMO capability.

12. A system comprising:
a dynamic antenna device configured to communicate with a station;
an antenna pattern group assignment engine coupled to the dynamic antenna device, wherein, in operation, the antenna pattern group assignment engine is configured to:
group discrete antenna patterns into station antenna pattern profiles, wherein a station type is associated with a station antenna pattern profile of the station antenna pattern profiles, the station type being defined by at least one of a degree of multiple-input multiple-output (MIMO) capability, a spatial stream characteristic, and one or more antenna polarization values;
determine that the station is of the station type;
an antenna pattern group search engine coupled to the dynamic antenna device, wherein, in operation, the antenna pattern group search engine is configured to:

select an antenna pattern group corresponding to the station type;
conduct an optimal antenna pattern search for the station using the antenna pattern group corresponding to the station type.

13. The system of claim 12, further comprising a wireless network access engine coupled to the dynamic antenna device, wherein, in operation, the wireless network access engine establishes a finite plurality of discrete polarization values, wherein each discrete antenna pattern of the discrete antenna patterns includes one or more of the discrete polarization values.

14. The system of claim 12, further comprising a wireless network access engine coupled to the dynamic antenna device, wherein, in operation, the wireless network access engine establishes a finite plurality of discrete polarization values, wherein each discrete antenna pattern of the discrete antenna patterns includes a non-null, non-redundant combination of the discrete polarization values.

15. The system of claim 12, wherein the station type is a defined by the spatial stream characteristic.

16. The system of claim 12, wherein the station type is defined by the one or more antenna polarization values.

17. The system of claim 12, wherein, in operation, the antenna pattern group assignment engine profiles the station and uses a result of the profiling to determine that the station is of the station type.

18. The system of claim 12, wherein, in operation, the antenna pattern group assignment engine receives an antenna pattern predisposition indicator from the station and uses the antenna pattern predisposition indicator to determine that the station is of the station type.

19. The system of claim 12, wherein, in operation, the antenna pattern group search engine follows a subplurality of the antenna pattern group to conduct the optimal antenna pattern search.

20. The system of claim 12, wherein optimal is defined as having an estimated highest gain of any of the other discrete antenna patterns from at least one of polarization matches and summation of signals.

21. The system of claim 12, wherein:
the dynamic antenna device is further configured to communicate with a second station;
the antenna pattern group assignment engine, in operation, is further configured to determine that the second station is of a second station type, wherein the second station type is associated with a second station antenna pattern profile of the station antenna pattern profiles;
the antenna pattern group search engine, in operation, is further configured to:
select a second antenna pattern group corresponding to the second station type;
conduct an optimal antenna pattern search for the second station using the second antenna pattern group corresponding to the second station type.

22. The system of claim 12, wherein the station type is defined by the degree of MIMO capability.

23. A system comprising:
a means for grouping discrete antenna patterns into station antenna pattern profiles, wherein a station type is associated with a station antenna pattern profile of the station antenna pattern profiles, the station type being defined by at least one of a degree of multiple-input multiple-output (MIMO) capability, a spatial stream characteristic, and one or more antenna polarization values;
a means for determining a station is of the station type;
a means for selecting an antenna pattern group corresponding to the station type;
a means for conducting an optimal antenna pattern search for the station using the antenna pattern group corresponding to the station type.

\* \* \* \* \*